United States Patent
Aweya et al.

(12) 
(10) Patent No.: US 6,584,111 B1
(45) Date of Patent: Jun. 24, 2003

(54) ABR FLOW CONTROL USING SINGLE BIT CONGESTION INDICATION AND WAVELET TRANSFORM FILTERING

(75) Inventors: James Aweya, Nepean (CA); Delfin Y. Montuno, Kanata (CA)

(73) Assignee: Northern Telecom Limited, Quebec (CA)

( * ) Notice: Subject to any disclaimer, the term of this patent is extended or adjusted under 35 U.S.C. 154(b) by 0 days.

(21) Appl. No.: 09/185,635

(22) Filed: Nov. 4, 1998

(51) Int. Cl.[7] ........................ H04L 12/28; H04L 12/56
(52) U.S. Cl. ........................... 370/412; 370/232
(58) Field of Search ................... 370/412, 413, 370/415, 419, 468, 425, 232, 395.2, 233, 230, 429, 231, 229, 414, 417, 396, 397, 398, 235, 236, 252

(56) References Cited

U.S. PATENT DOCUMENTS 5,696,764 A    12/1997  Soumiya et al.
5,959,991 A  *  9/1999  Hatono ........................ 370/395
5,991,272 A  * 11/1999  Key .............................. 370/252
6,292,466 B1 *  9/2001  Droz ............................ 370/395

FOREIGN PATENT DOCUMENTS

WO        WO 97/22224        6/1997

* cited by examiner

Primary Examiner—Douglas Olms
Assistant Examiner—Ricardo M. Pizarro
(74) Attorney, Agent, or Firm—Finnegan, Henderson, Farabow, Garrett & Dunner, L.L.P.

(57) ABSTRACT

A flow control system and methodology controls and avoids congestion in an Asynchronous Transfer Mode (ATM) network. The congestion state of a network switch is determined based on incoming Available Bit Rate (ABR) traffic, Constant Bit Rate (CBR) traffic, and Variable Bit Rate (VBR) traffic. High-frequency fluctuations due to VBR traffic are filtered out of the CBR/VBR traffic to determine the underlying trend of network traffic. A filtering mechanism is based on wavelet transforms. The switch congestion state is determined based on the current ABR traffic, the filtered CBR/VBR traffic, and the current status of buffers in the switch. The congestion state can then be used to adjust the ABR rate according to a feedback scheme such as Explicit Forward Congestion Indication (EFCI).

20 Claims, 13 Drawing Sheets

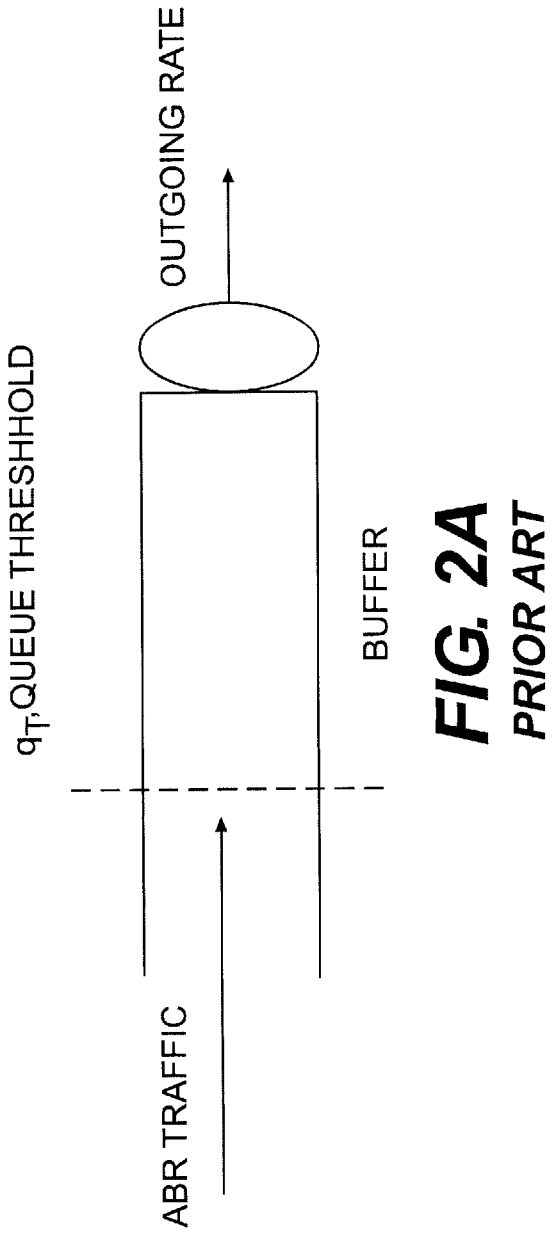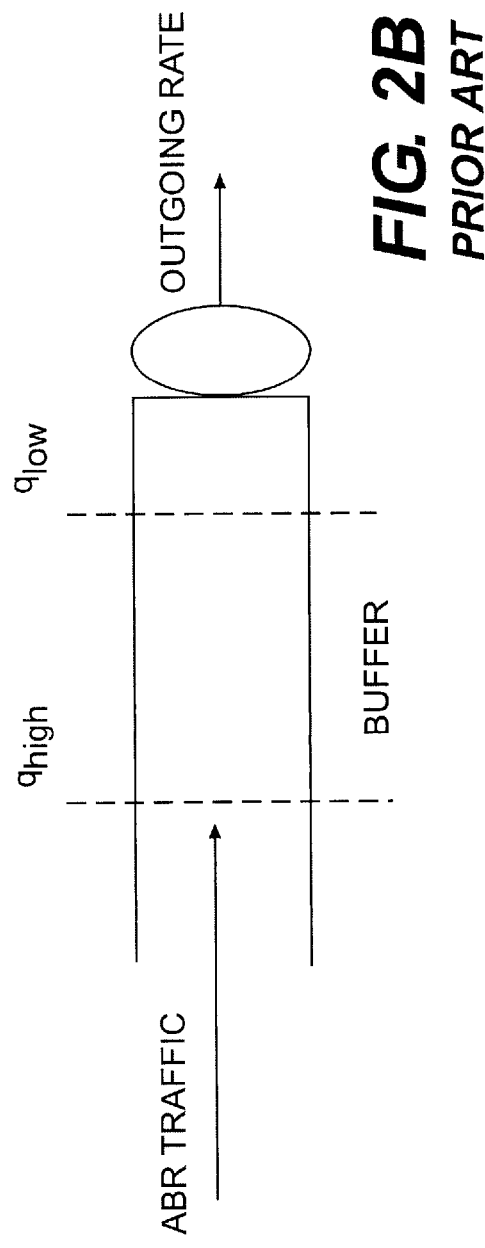

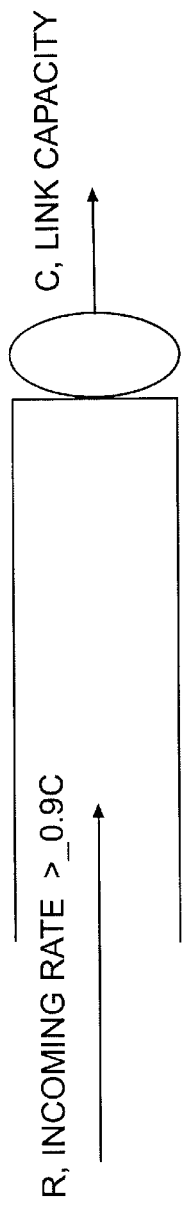
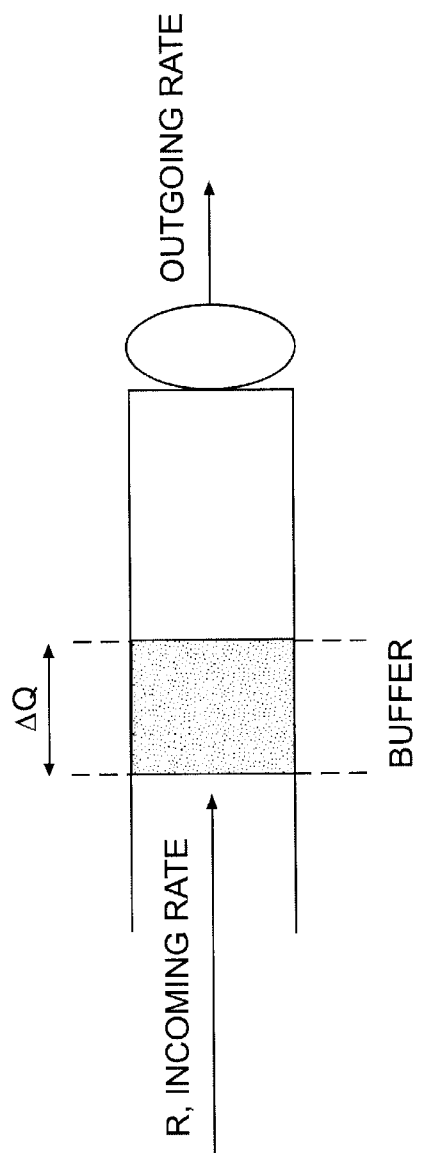
FIG. 3
*PRIOR ART*
FIG. 4
*PRIOR ART*

ABR FLOW CONTROL USING SINGLE BIT CONGESTION INDICATION AND WAVELET TRANSFORM FILTERING

BACKGROUND OF THE INVENTION

The present invention relates to congestion control and avoidance in a communications network and, more particularly, to controlling and avoiding congestion in an Asynchronous Transfer Mode (ATM) network using a wavelet-based filtering mechanism in an Available Bit Rate (ABR) Explicit Forward Congestion Indication (EFCI) flow control solution.

The *ATM Forum Traffic Management Specification*, Version 4.0, 1996 (TM4.0), currently defines five service classes to support the diverse requirements of multimedia traffic: Constant Bit Rate (CBR), Real-Time Variable Bit Rate (RT-VBR), Non-Real-Time Variable Bit Rate (NRT-VBR), Available Bit Rate (ABR), and Unspecified Bit Rate (UBR). Both CBR and RT-VBR service classes provide stringent cell transmission delay (CTD), cell delay variation (CDV), and cell loss ratio (CLR) constraints. NRT-VBR service provides stringent CTD and CLR constraints but no CDV guarantees. CBR, RT-VBR, and NRT-VBR all rely on the network reservation of resources to provide a required quality of service (QoS).

ABR and UBR service classes are defined for applications with unpredictable bandwidth requirements, that are sensitive to cell loss, but are able to tolerate a certain amount of delay. ABR and UBR service classes are designed so that applications in these classes can grab any unused network resources that VBR and CBR traffic does not utilize, i.e., unused bandwidth and buffer space. Gains due to statistical resource utilization, however, come at the risk of potential congestion when many applications compete for network resources. Therefore, proper congestion control must be in place to ensure that network resources can be shared in a fair manner and that performance objectives such as cell loss ratio can be maintained.

UBR service is truly "best-effort," and thus the network provides no service guarantees for UBR. ABR, however, provides some service guarantees. Therefore, ABR must comply with the flow control framework specified in TM4.0, which supports several types of feedback to control the source rate in response to changing transfer characteristics. This feedback information is conveyed to the source, which adapts its traffic in accordance with the feedback. The feedback information includes the state of congestion and a fair share of the available bandwidth according to a network-specific allocation policy. To ensure interoperability, an ABR end system must always implement the source and destination behavior defined in TM4.0. In particular, the cell rate from an ABR source is bounded by a Peak Cell Rate (PCR) and Minimum Cell Rate (MCR) and must abide by a Cell Delay Variation Tolerance (CDVT).

The ABR congestion control scheme specified in TM4.0 is a rate-based, closed-loop, per-connection control that utilizes the feedback information from the network to regulate the rate of cell transmission at the source. FIG. 1 illustrates the basic operation of ABR congestion control. In network 100, source 102 transmits data cells 108 to destination 104 via one or more switches in network 100, one of which is shown as switch 106 in FIG. 1. Source 102 also generates special probe cells 110 referred to as resource management (RM) cells in proportion to its current data cell rate. Destination 104 turns around and sends RM cells 110 back to source 102 in the other direction. The RM cells, which can be examined and modified by the switches in both forward and backward directions, carry feedback information of the state of congestion and the fair rate allocation. The following summarizes the operation of the rate-based control scheme, the details of which, along with the detailed RM cell format, are found in TM4.0, which is incorporated herein by reference.

At switch shall implement at least one of the following methods to control congestion:

a) Explicit Forward Congestion Indication (EFCI) marking: The ATM switch may set the EFCI state in the data cell headers. Most first-generation ATM switches implemented this mechanism even before the RM cell was fully defined.

b) Relative rate marking: The ATM switch may set t he congestion indication (CI) bit or the no increase (NI) bit in the forward and/or backward RM cells.

c) Explicit rate marking: The ATM switch may reduce the explicit rate (ER) field of forward and/or backward RM cells.

Switches that implement EFCI marking and relative rate marking are known as binary switches, which are simple to implement but may result in unfairness, congestion oscillation, and slow congestion response. Switches that implement explicit rate marking are generally referred to as ER switches and require sophisticated mechanisms at the switches to compute a fair share of the bandwidth. The TM4.0 standard-defined source and destination behaviors, however, allow interoperation of all three congestion control options according to the following rules.

Once the source has received permission, it begins scheduling cells for transmission at the allowed cell rate (ACR). The ACR is initially set to the initial cell rate (ICR) and is always bounded between the minimum cell rate (MCR) and the peak cell rate (PCR) specified by the application at call setup. An RM cell precedes transmission of any data cells. The source continues to send RM cells, typically after every Nrm data cells, where Nrm is the maximum number of data cells a source may send for each forward RM cell. The source places the ACR value in the current cell rate (CCR) field of the RM cell, and i:the rate at which it wishes to transmit cells (usually the PCR value) in the ER field. The RM cells traverse forward through the network, and the destination turns the RM cells around in the backward direction. Intermediate switches on the path notify the source of congestion by marking the EFCI bit in the data cells and the CI or NI bit in the RM cell, and/or reducing the ER value in the RM cells.

Upon receiving the RM cell in return, the source should adapt its ACR to the information carried in the RM cell. If the CI bit is not set, the source may linearly increase its ACR by a fixed increment (RIF*PCR), where the rate increase factor (RIF) is determined at call setup. This increase can reach the ER value in the RM cell, but should never exceed the PCR. If the CI bit is set, the source must exponentially decrease its ACR by an amount greater than or equal to a proportion of its current ACR (RDF*ACR), where the rate decrease factor (RDF) is also determined at call setup. The factors RIF and RDF control the rate at which the sources increase and decrease, respectively.

If the ACR is still greater than the returned ER, the source must further decrease its ACR to the returned ER value, although it should never be below the MCR. If the NI bit is set, the source should observe the CI and ER fields in the RM cell, but it is not allowed to increase the ACR above its current value.

In EFCI marking binary feedback control schemes, the ATM switch sets the EFCI bit in the ATM cell header during congestion. As described above, end systems use this one-bit information contained in each cell to increase/decrease their cell rates by an incremental amount. This basic mechanism imposes very small implementation burdens on switches and requires minimal processing. Several mechanisms exist for the switch to determine the onset of congestion, including the following EFCI schemes.

Many first generation ATM switches implemented binary schemes based on a simple first-in-first-out (FIFO) queuing mechanism shared by all ABR connections. Under this basic EFCI scheme, a switch determines the onset of congestion at time interval t when the queue level q(t) in one of the switch's buffers exceeds some preset threshold $q_T$, shown in FIG. 2A:

$$q(t) \geq q_t \rightarrow \text{EFCI bit(data cell)}=1.$$

In some implementations of this scheme, the switch declares the onset of congestion if the instantaneous queue size exceeds a threshold $q_{high}$, shown in FIG. 2B, and detects a normal "uncongested" state when the queue size drops below another threshold $q_{low}$, also shown in FIG. 2B.

This basic binary EFCI scheme, which detects nodal congestion by comparing the present queue size with a preset threshold, has several disadvantages. First, congestion detection is delayed by the amount of time required to build up the queue. Second, the resolution of congestion is also delayed by the amount of time required to drain the queue. Such delayed detection followed by the unnecessary extension of congestion periods significantly increases the oscillation period as well as the oscillation magnitude of ABR traffic within the network, causing a large consumption of buffer resources. Because both the queue levels and the ABR source rates oscillate continually, large buffers are required to maximize network utilization.

A second binary EFCI scheme monitors the rate of cells coming into the queue, R in FIG. 3, relative to a threshold on a short interval basis. The threshold may be defined, for example, in terms of a targeted link utilization, e.g., 0.9C, where C is the link capacity. If R exceeds a predefined threshold, the switch declares congestion. In a simple implementation of this scheme, the switch declares congestion if the count of queue input cells exceeds $T_{cnt}$ in an interval of $T_{int}$. This scheme improves upon the first scheme by implementing congestion avoidance, i.e., by controlling the incoming rate, the switch avoids the onset of congestion rather than detecting congestion after it occurs.

In Y. Zhao, S. Q. Li, and S. Sigarto, "An Improved EFCI Scheme with Early Congestion Detection," *ATM Forum Contribution AF-TM*96-1084, February, 1996, the authors proposed a variant of the rate-thresholding scheme called EFCI with Early Congestion Detection (EFCI-ECD). To improve network resource utilization, this scheme detects congestion by monitoring the low-pass filtered arrival rates. Recent multimedia queuing analyses (S. Q. Li and C. Hwang, "Queue Response to Input Correlation Functions: Continuous Spectral Analysis," *IEEE/ACM Trans. Networking*, Vol. 1, No. 6, December, 1993, pp. 678–692; S. Q. Li, S. Chong, and C. Hwang, "Link Capacity Allocation and Network Control by Filtered Input Rate in High Speed Networks," *IEEE/ACM Trans. Networking*, Vol 3, No. 1, February, 1995, pp. 10–15) indicate that queue congestion is mainly captured by low-frequency traffic behavior. Filtering of the VBR traffic, for instance, eliminates the high-frequency fluctuations which are easily absorbed by buffering; ABR rates should not be adjusted based on these short-term VBR bursts.

Operation of a rate-thresholding scheme that monitors low-pass filtered cell arrival rates can be described mathematically as follows. Let C denote the link capacity and $\rho_T$ denote a targeted utilization (e.g., 0.9) so that $\rho_T C$ specifies some preset rate threshold. Let $r_A(t)$ denote the total measured ABR traffic rate and let $r_B(t)$ denote the total measured background or guaranteed traffic (i.e., CBR and VBR) rate at time interval t; let $\tilde{r}_A(t)$ and $\tilde{r}_B(t)$ represent the corresponding low-pass filtered rates. A switch implementing the rate thresholding scheme determines that congestion is imminent at time interval t and sets the EFCI bit when the aggregate filtered rates exceed the rate threshold:

$$\tilde{r}_A(t)+\tilde{r}_B(t)>\rho_T C \rightarrow \text{EFCI bit (data cell)}=1$$

By removing the high-frequency fluctuations, filtering improves stability and reduces oscillations. However, to ensure stability, the rate-thresholding scheme should be combined with the basic queue fill thresholding scheme, i.e., the EFCI bit should also be set when a queue threshold is exceeded. ),sing low-pass filtered rates as a congestion indicator improves performance by detecting congestion changes more rapidly. Depending on the burstiness of the network traffic, $\rho_T$ may be tuned to values closer to 1.

A larger value of $\rho_T$ decreases the safety margin of slack bandwidth that may be used to accommodate sudden bursts in traffic. Hence, network operators that operate their networks with a high $\rho_T$ run a higher risk of violating the service requirements of some connections. The appropriate utilization target of any given link depends on the characteristics of the traffic flowing through it. If each source's rate is small compared to link capacity (small grain size) and bursts are short, the link's utilization target can be set higher. Bursty sources with large, long bursts or long idle periods require a lower link utilization target.

In addition to detecting congestion early and reducing oscillations in ABR traffic, the low-pass filtered rate-thresholding scheme results in a substantially shorter time period of congestion than the basic queue-thresholding scheme. Because of improved congestion detection performance, the buffer capacity required at each switching node is substantially reduced.

A third binary EFCI scheme, illustrated in FIG. 4, monitors the change in queue size Q to detect the onset of congestion. In this scheme, the first difference of queue depth, $\Delta Q/\Delta t$ is used as the congestion indicator, allowing tight control of the queue size.

The main advantage of existing binary feedback schemes is their implementation simplicity. The first-generation ATM switches implement a simple FIFO queuing mechanism and mark the EFCI bit in the event of congestion. However, the proper tuning of the rate increase and decrease parameters (RIF and RDF) and the queue or rate threshold ($q_T$ or $\rho_T$) is required. The maximum queue length and the achieved utilization depend on the proper tuning of all the parameters. Specification of $q_T$ and $\rho_T$ yields vastly different buffer requirements and loads depending on the selection of RIF and RDF.

The main disadvantage of the existing binary feedback schemes is that they are not fair in a multiple-node network. The schemes may cause some connections to have unfair access to the available bandwidth depending on the network topology and end system behavior. It has been observed that sources which have several hops on their routes are more likely to have an EFCI bit set to 1 than sources with few hops. As a result, it is unlikely that long-hop connections will be able to increase their rates, and consequently they will be beaten down by short-hop connections. This has been referred to as the beat-down problem (J. Bennet and G. T. Des Jardins, "Comments on the July PRCA Rate Control Baseline," *ATM Forum Contribution AF-TM* 94-0682, July, 1994).

In A. Arulambalam, X. Chen, and N. Ansari, "Allocating Fair Rates for Available Bit Rate Service in ATM Networks," *IEEE Communication Magazine*, November, 1996, pp. 92–100, the authors propose several alternatives for alleviating the unfairness problem in binary feedback schemes. The first alternative is to provide each connection or group of connections with separate queues. Such a per-connection queuing mechanism makes it possible to determine the congestion status of a connection in isolation from the rest of the connections. Because only those connections that cause the, congestion of their associated queues are subject to congestion marking, the beat-down problem in the binary scheme can be eliminated. Thus, this isolation ensures fair access to buffer space and bandwidth among all competing connections.

This per-connection queuing approach also enjoys several other distinct benefits. First, per-connection queuing can be used to help protect individual connections effectively since a misbehaving connection can, only cause its own queue to overflow. Second, it allows the delay and the loss behavior of individual connections to be decoupled from each other, leading to better QoS control. Finally, per-connection information is readily available to help the implementation of other types of congestion control, such as early packet discard (EPD) and partial packet discard (PPD) mechanisms.

Although per-connection queuing offers considerable advantages over single FIFO queuing, this comes at the significant cost of switch design and implementation. Efficient buffer management and scheduling among the queues can be costly to design and implement. Such implementation may be prohibitive when the number of connections grows substantially large.

The second feasible alternative is to provide selective or intelligent marking on a common FIFO queuing mechanism when congestion takes place. In this alternative, a switch computes a fair share and a connection is asked to decrease its rate by marking the EFCI bit only if its current cell rate is above the computed fair share. In this approach, cells belonging to virtual circuits are selectively marked based on their current cell rates which are carried in the RM cells. In addition to EFCI marking, CI and NI bits in the RM cells can be used to regulate the rate at the source.

Although per-connection queuing and intelligent marking provide good solutions for the beat-down problem, they do not address the other problems of binary feedback schemes. In particular, as has been described, binary feedback schemes are generally slow in response to congestion because it may take several round-trips to alleviate congestion or utilize any unused bandwidth. Another problem is that binary schemes may generate large oscillations even at steady-state, making it difficult to achieve very high link utilization. The best solution for improving stability and reducing oscillations in the ABR, cell rates and queue levels in a binary scheme is to implement a low-pass filtered rate-thresholding scheme that filters input traffic by removing the high-frequency fluctuations in the arrival process.

The multimedia queuing analyses by Li et al. observe that in a finite-buffer system, the traffic arrival process is essentially characterized by the low-frequency components, the effective capacity at each node is essentially captured by the low-frequency input traffic filtered at a properly selected cut-off frequency, and the high-frequency components can be absorbed by the finite buffer capacity at each node. However, many filtering techniques known or used today are generally not suitable for multimedia applications. For example, in Li et al. and S. Chong, S. Q. Li, and J. Ghosh, "Dynamic Bandwidth Allocation for Efficient Transport of Real-Time VBR Video over ATM," *INFOCOM'94*, 1994, pp. 81–90, the authors use a Finite Impulse Response (FIR) filter with a very sharp cut-off frequency. This filtering approach has certain limitations because the cut-off frequency has to be known for each traffic stream. Although this approach may be applicable to video servers where the filtered input rate can be precalculated and used at connection setup time, it is difficult to predetermine what the cut-off frequency should be for an aggregate traffic stream resulting from the multiplexing or concentration of different traffic streams. Furthermore, simple filtering at a certain cut-off frequency is not sufficient because there is no notion of intensity of the frequency involved. The approach adopted by Zhao et al., in which the filtering function is implemented by a simple short-term moving average operation, is also unsuitable for multimedia connections because the moving average filter cannot handle nonstationary signals or signals with significant transient components.

Many traffic filtering mechanisms are designed in an ad hoc manner. Because the arrival and service rates in networks are time-varying, it is crucial to estimate network parameters by an adaptive procedure that takes changes into account. Furthermore, since the estimator must be implemented in real-time, its computational and space complexity should be as small as possible. Time weighted moving averages (e.g., exponentially weighted moving average (EWMA)) have these properties and are often used in practice. However, appropriate filter weights are difficult to determine and are usually chosen heuristically.

It is desirable, therefore, to provide a binary feedback control scheme that monitors the queue input rate relative to a threshold. It is more desirable to provide such a scheme that operates on low-pass filtered traffic so that ABR rates are not modified based on fluctuations due to unfiltered VBR traffic. It is even more desirable to provide a filtering process that is simple al d inexpensive to implement and is effective in filtering multimedia application traffic. Finally, it is desirable to provide a binary feedback control scheme that complies with existing standards.

SUMMARY OF THE INVENTION

This invention satisfies those desires by providing a flow control solution using a wavelet transform-based filtering mechanism.

A system consistent with the present invention is for use in controlling congestion in a network with a network switch having a first buffer for receiving packets of a first type into a first queue and a second buffer for receiving packets of a second type into a second queue. The system includes a first measurement module coupled to the first buffer for measuring an arrival rate of the packets of the first type, a second measurement module coupled to the second buffer for measuring an arrival rate of the packets of the second type, and a flow control module coupled to the first and second measurement modules and the second buffer for determining a congestion state of the switch based on the arrival rates of the first and second type packets and the queue length of the second queue. The first measurement module includes a sampler for sampling the arrivals of the first type packets and a wavelet transform processor coupled to the sampler for determining an effective arrival rate of the first type packets in response to the sampled arrivals.

Methods are also provided for carrying out the systems consistent with the present invention.

Consistent with the present invention, the first type packets comprise CBR and VBR packets, and the second type packets comprise ABR packets. However, it should be appreciated by one skilled in the art that systems and methods consistent with the present invention have a potentially broader application to flow control in other packet networks.

The advantages accruing to the present invention are numerous. Methods and systems consistent with the present invention provide an efficient and effective binary ABR flow control solution. The solution results in smaller oscillations in ABR rates, and therefore smaller buffer requirements in network switches.

The above desires, other desires, features, and advantages of the present invention will be readily appreciated by one of ordinary skill in the art from the following detailed description of the preferred implementations when taken in connection with the accompanying drawings.

BRIEF DESCRIPTION OF THE DRAWINGS

FIGS. 2A–B illustrate an EFCI congestion control scheme with simple queue fill thresholding;

FIG. 3 illustrates an EFCI congestion control and avoidance scheme with queue input rate thresholding;

FIG. 4 illustrates an EFCI congestion control scheme with queue growth rate thresholding;

DETAILED DESCRIPTION OF THE PREFERRED EMBODIMENTS

Figure 1:
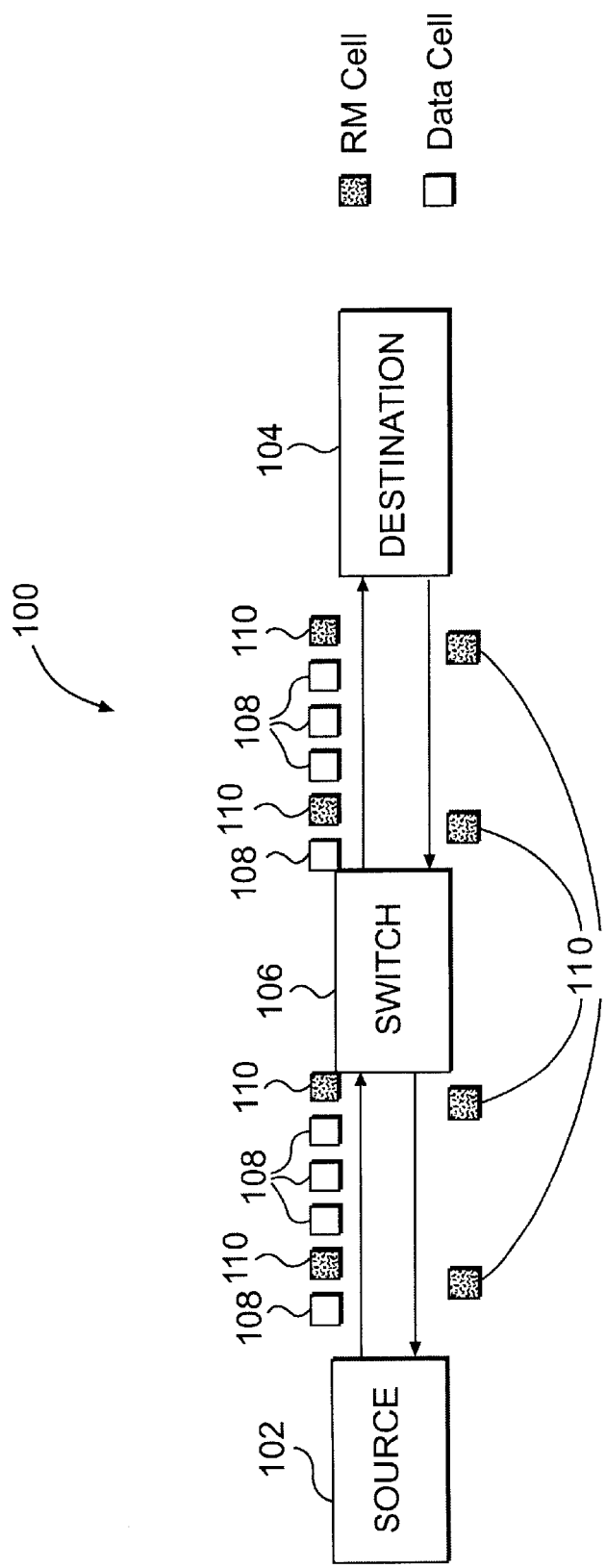
FIG. 1 is a diagram illustrating the basic operation of ABR congestion control.
Figure 5:
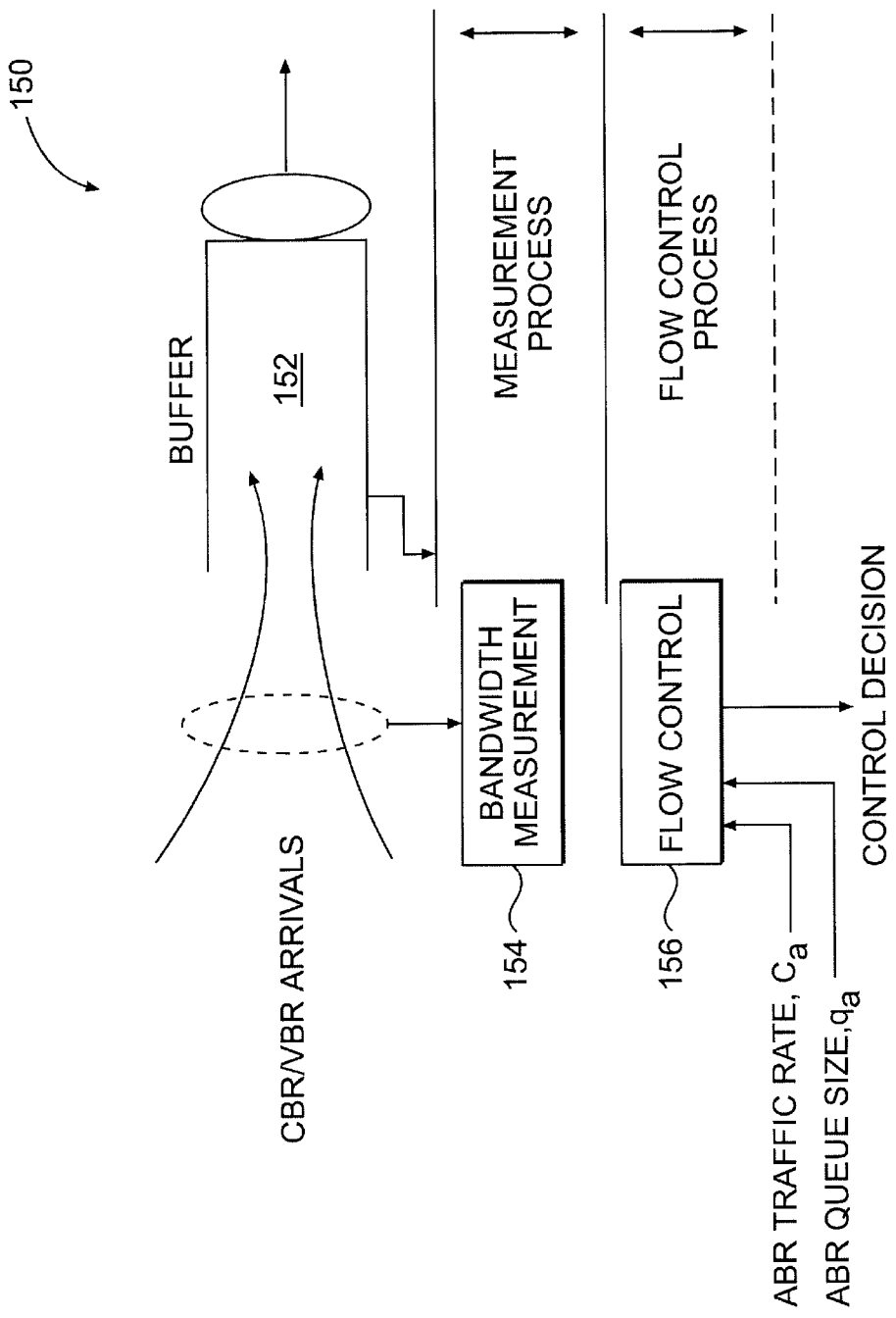
FIG. 5 is a high-level block diagram of an ABR flow control system consistent with the present invention.

FIG. 5 illustrates, at a high level, an ABR flow control system consistent with the present invention. The system, shown generally by reference numeral 150, operates within a network switch, such as an ATM switch. Incoming CBR/VBR cells arrive at the switch and enter buffer 152. Bandwidth measurement module 154 determines the effective bandwidth utilized by current CBR/VBR traffic based on information received about cell arrivals. Flow control module 156 uses the effective CBR/VBR bandwidth and the effective ABR rate ($C_a$) and queue status ($q_a$) to detect congestion and outputs a decision related to flow control, e.g., the EFCI bit should be set to 1 because congestion has been detected. Consistent with the present invention, bandwidth measurement module 154 and flow control module 156 may be implemented as software stored in a memory in the ATM switch and executed by a processor in the ATM switch. The memory may be any type of computer-readable medium, such as any electronic, magnetic, or optical read/write storage device.

As explained above, it is desirable to measure the bandwidth of incoming traffic in such a way that high-frequency components due to VBR traffic are filtered out. By extracting the underlying low-frequency traffic profile, bandwidth measurement module 154 provides flow control module 156 with a more stable effective bandwidth measurement on which to base a flow control decision.

It is also desirable that the filtering mechanism be adaptive and computationally simple. Time weighted moving average schemes have these properties, but it is difficult to choose correct filtering weights for such schemes. Therefore, an alternative signal analysis method is needed to effectively filter the high-frequency components.

One example of a signal analysis tool is the Fourier Transform (FT), which has become a cornerstone of modern data analysis. The FT translates a function in the time domain into a function in the complex (real and imaginary) frequency domain, where it can be analyzed for its frequency content. The FT describes the original function in terms of orthogonal basis functions of sines and cosines of infinite duration. The Fourier coefficients of the transformed function represent the contribution of the sines and cosines at each frequency. The FT is most commonly used in the form of the Discrete Fourier Transform (DFT), which analyzes discretely sampled time series. The DFT works under the assumption that the original time domain function is periodic in nature. :As a result, the DFT has difficulty with functions that have transient components, that is, components which are localized in time. This is especially apparent when a signal has sharp transitions. Another problem is that the DFT of a signal does not convey any information pertaining to translation of the signal in time other than the phase of each Fourier coefficient. The phase values are averaged for the input function. Applications that use the DFT often work around the first problem by windowing the input data so that the sampled values converge to zero at the endpoints. Attempts to solve the second problem, such as the development of the short-time Fourier transform (STFT), have met with marginal success.

Wavelet Functions

In recent years, new families of orthogonal basis functions have been discovered that lead to transforms that overcome the problems: of the DFT. These basis functions are called wavelets, which, unlike the sine and cosine wave of the FT, do not need to have infinite duration. They can be non-zero for only a small range of the wavelet function. This "compact support" allows the wavelet transform (WT) to transform a time domain function into a representation that is not only localized in frequency (like the FT) but in time as well. With the frequency content evolving with time for most real-time signals (including traffic in computer networks), time-frequency analysis using wavelets has become a more powerful tool.

The fundamentals of wavelet functions will now be described to the extent they pertain to the present invention.

Details can be found in S. G. Mallat, "A Theory for Multiresolution Signal Decomposition: The Wavelet Representation," *IEEE Tran. Pattern Analysis and Mach. Intelligence*, Vol. 11, No. 7, July, 1989, pp. 674–693, and O. Rioul and M. Vetterli, "Wavelets and Signal Processing," *IEEE SP Magazine*, October, 1991, pp. 14–38, both of which are incorporated herein by reference.

There are two fundamental equations upon which wavelet calculations are based. These are the scaling function (also called the dilation equation or fundamental recursion) and the primary wavelet function (mother wavelet):

$$\phi(t)=\Sigma_{k \in Z} a_k \phi(2t-k); \; \psi(t)=\Sigma_{k \in Z}(-1^k)a_{k-1}\phi(2t+k), \quad (1)$$

where Z is the set of integers and the $a_k$ are the wavelet coefficients. Both of these functions are two-scale difference equations and are the prototypes of a class of orthonormal basis functions of the form:

$$\phi_{j,k}(t)=2^{j/2}\phi(2^j t-k); \; j,k \in Z \psi_{j,k}(t)=2^{j/2}\psi(2^j t-k); \; j,k \in Z. \quad (2)$$

The parameter j controls the dilation or compression of the function in time scale as well as in amplitude. The parameter k controls the translation of the function in time. The set of basis functions formed by $\phi(t)$ and $\psi(t)$ is a system of scaled and translated wavelets.

Wavelet systems can be either real or complex-valued, though most research has used real-valued wavelet systems. Wavelet systems may or may not have compact support. Wavelets have compact support if and only if they have a finite number of non-zero coefficients. Since compact support is what gives wavelets the ability to localize in both time and frequency, only wavelets of that type will be described.

Several techniques have been used to create wavelet systems. These include cubic splines, complex exponentials, and parameter space constructions. Parameter space constructions have been used to construct wavelets which are orthonormal bases. The Haar wavelet (the first wavelet discovered) and the Daubechies wavelets belong to this class. Orthonormal wavelets allow perfect reconstruction of a function from its wavelet transform coefficients by the inverse WT. The following set of conditions must be satisfied before a set of coefficients can represent an orthonormal wavelet:

$$\sum_{k \in Z} a_{2k} = 1/\sqrt{2}; \; \sum_{k \in Z} a_{2k+1} = 1/\sqrt{2}; \quad (3)$$

$$\sum_{k \in Z} a_k a_{k+2l} = 0, \; \text{for } l \neq 0; \; \sum_{k \in Z} \overline{a_k} a_k = 1$$

where $\overline{a}_k$ is the complex conjugate of $a_k$.

Once a wavelet system is created, it can be used to expand a function g(t) in terms of the basis functions:

$$g(t) = \sum_{l=-\infty}^{\infty} c_l \phi_l(t) + \sum_{j=0}^{\infty} \sum_{k=-\infty}^{\infty} d_{j,k} \psi_{j,k}(t), \quad (4)$$

with the coefficients calculated by the inner product as:

$$c_l = (\phi_l(t)|g) = \int g(t)\phi_l(t)dt \quad (5)$$

$$d_{j,k} = (\psi_{j,k}(t)|g) = \int g(t)\psi_{j,k}(t)dt \quad (6)$$

If the wavelet system has compact support and an upper limit J is placed upon the degree of dilation j, then the expansion equation becomes:

$$g(t) = \sum_{l \in Z} c_l \phi_l(t) + \sum_{j=1}^{J} \sum_{k \in Z} d_{j,k} \psi_{j,k}(t) \quad (7)$$

The expansion coefficients $c_l$ represent the approximation of the original signal g(t) with a resolution of one point per every $2^j$ points of the original signal. The expansion coefficients $d_{j,k}$ represent the details of the original signal at different levels of resolution. These coefficients completely and uniquely describe the original signal and can be used in ways similar to the Fourier transform. The Wavelet Transform, then, is the process of determining the values of $c_l$ and $d_{j,k}$ for a given g(f) and wavelet system.

The expansion equation naturally leads to a recursive algorithm for the wavelet transform if some assumptions are made. First, the function g(t) is taken as a sequence of discrete points, y, sampled at $2^m$ points per unit interval. These points can be viewed as the inner product of $\phi$ and g(t). That is, the sample points are an approximation, or $c_l$ coefficients, of the continuous function g(t). This allows the $c_l$ and $d_{j,k}$ terms to be calculated by convolution of the samples of g(t) with the wavelet coefficients $a_k$. Daubechies has discovered that the WT can be implemented with a specially designed pair of finite impulse response (FIR) filters called a quadrature mirror filter (QMF) pair. A FIR filter performs the dot product (or sum of products) between the filter coefficients and the discrete data samples. The act of passing a set of discrete samples, representing a signal, through a FIR filter is a discrete convolution of the signal with the coefficients of the filter.

Figure 6:
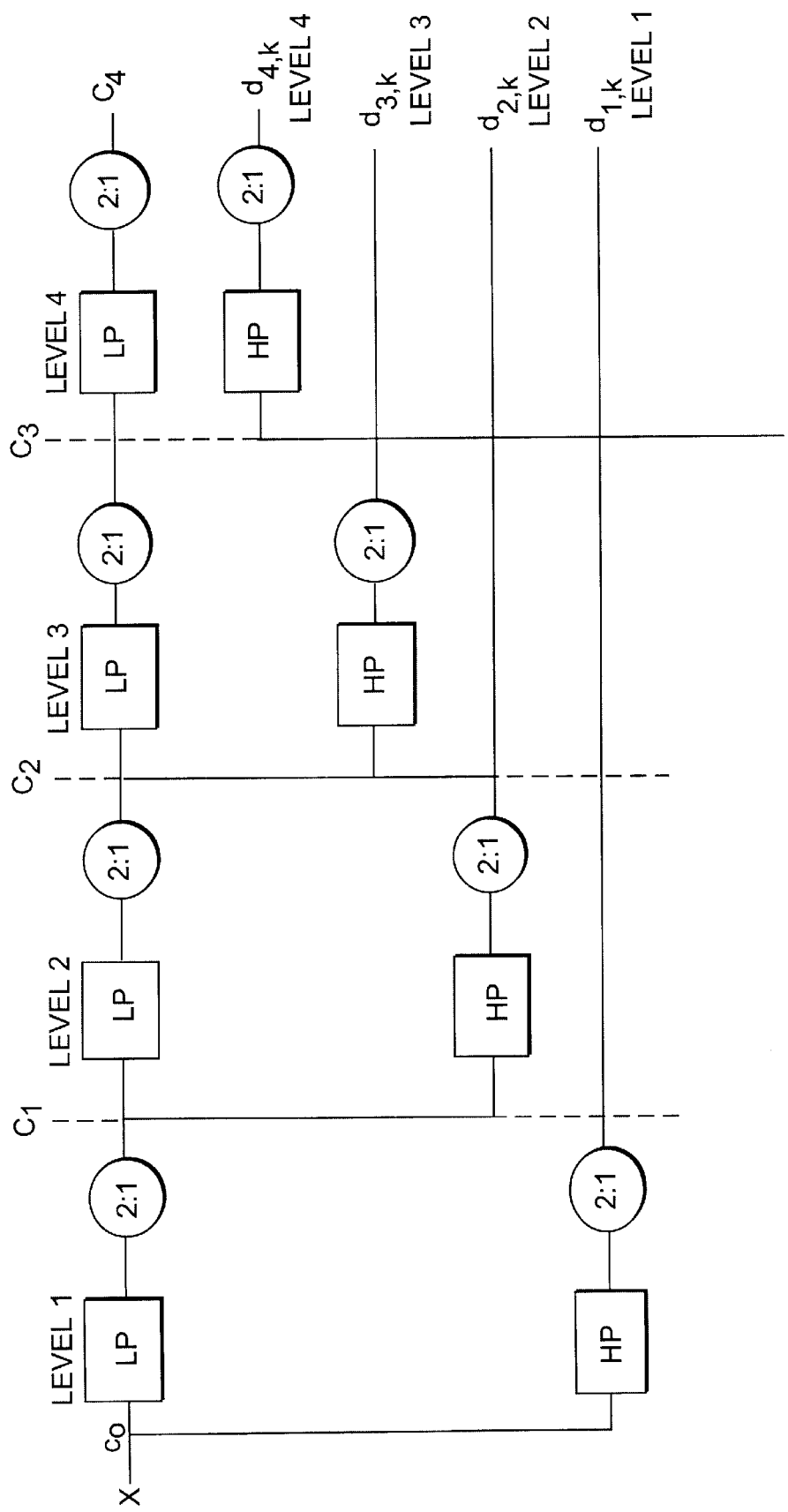
FIG. 6 illustrates an algorithm for calculating the forward fast wavelet transform.

The outputs of the QMF filter pair are decimated (or down-sampled) by a factor of two, that is, every other output sample of the filter is kept, the others being discarded. The low-frequency (low-pass) filter output is fed into another identical QMF filter pair. As illustrated in FIG. 6, this operation can be repeated recursively as a tree or pyramid algorithm, yielding a group of signals that divide the spectrum of the original signal into octave bands with successively coarser measurements in time as the width of each spectral band narrows and decreases with frequency.

Mallat has shown that the tree or pyramid algorithm can be applied to the wavelet transform by using the wavelet coefficients as the filter coefficients of the QMF filter pairs. The same wavelet coefficients are used in both the low-pass and high-pass filters. The low-pass filter coefficients are associated with the $a_k$ of the scaling function $\phi$. The output of each low-pass filter is $c_l$, or approximation components, of the original signal for that level of the tree. The high-pass filter is associated with the $a_k$ of the wavelet function $\psi$. The output of each high-pass filter is the $d_{j,k}$, or detail components, of the original signal at resolution $2^j$. The $c_l$ of the previous level are used to generate the new $c_l$ and $d_{j,k}$ for the next level of the tree. The decimation by two corresponds to the multi-resolution nature (the j parameter) of the scaling and wavelet functions.

Figure 7:
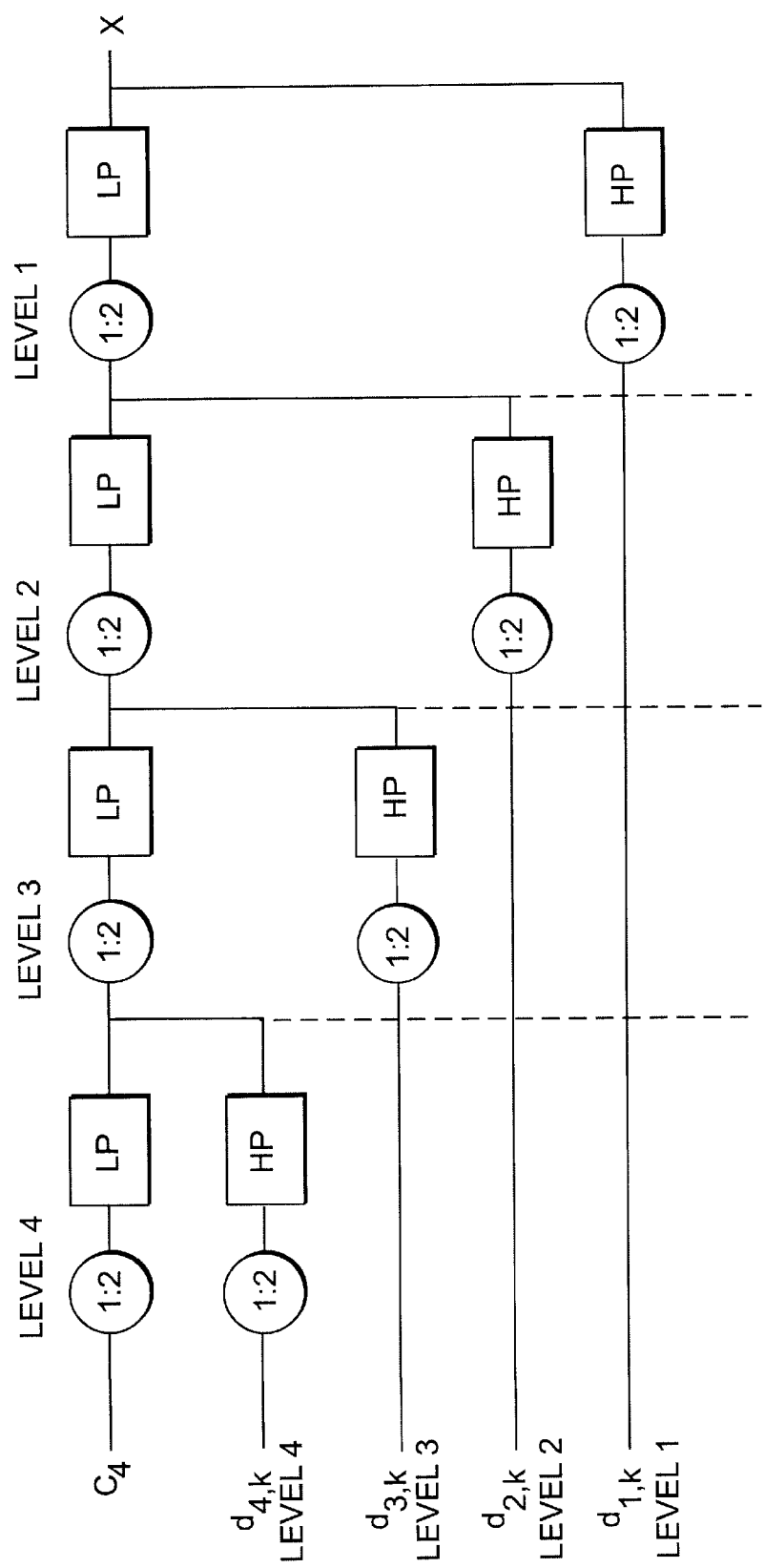
FIG. 7 illustrates an algorithm for calculating the inverse fast wavelet transform.

The inverse DWT essentially performs the operations associated with the DWT in the opposite direction. The inverse transform coefficients are combined to reconstruct the original signal. The same $a_k$ coefficients are used in the forward transform, except the ordering of the coefficients is reversed. As illustrated in FIG. 7, the process works up the branches of the tree combining the approximation and detail signals into approximation signals with higher levels of detail. Instead of decimation, the signals are interpolated, that is, zeroes are placed between each approximation and detail sample and the new signals are passed through the low-pass and high-pass filters, respectively. The intermediate zero values are replaced by "estimates" derived from the convolutions. The outputs of the filters are then summed to form the approximation coefficients for the next higher level of resolution. The final set of approximation coefficients at the top of the tree in the reverse transform is a reconstruction of the original signal data points. II An added advantage of the DWT is that it is more computationally efficient than the FFT. An FFT of length N (where N is an integral power of 2) requires $O(N\log_2(N))$ operations. A DWT of length N requires only $O(N)$ operations. The FIR filters are linear processing elements. Only half as many operations are performed on each level of resolution in the tree algorithm as in the previous level.

Because data traffic in computer networks is generally nonstationary (i.e., varying with time) and possesses some form of statistical self-similar (also known as fractal) behavior, analysis using wavelet transforms is well-suited to such traffic. Self-similarity in networking traffic manifests itself in burstiness across a wide spectrum of time scales. Self-similar traffic models have been created that can capture correlation structures observed in networking traffic. On the other hand, the mathematical analyses of these models are often extremely difficult. The wavelet transform enables analysis of the traffic without assumptions with respect to either the stationarity of the data or the statistical distribution embodied in the data. These features are retained because the WT is a linear operator that preserves the time localization of the data in the transform coefficients at the different levels of scale.

Discrete Wavelet Transform (DWT) Algorithms

Methods for signal decomposition and signal reconstruction using discrete wavelet transforms to be used in filtering methods consistent with the present invention will now be presented. The DWT may be computed recursively as a series of convolutions and decimations. At each scale level j an input sequence $S^{j-1}(n)$ is fed into a low-pass and high-pass filter, $H(z)$ and $G(z)$, respectively. The output from the high-pass filter $G(z)$ represents the detail information in the original signal at the given scale j, denoted by $W^j(n)$. The output of the low pass filter $H(z)$ represents the remaining (coarse) information in the original signal, and is denoted by $S^j(n)$. $H(z)$ and $G(z)$ are the z-transforms of the set of coefficients representing the scaling function $\phi(t)$ and the wavelet function $\psi(t)$, respectively.

The sequential DWT algorithm may be expressed as $$S^j(n) = \Sigma_k S^{j-1}(k) H(2n-k), \quad (8)$$

$$W^j(n) = \Sigma_k S^{j-1}(k) G(2n-k), \quad (9)$$

At the output of every level there is a downsampling operation which appears as the factor two in the argument of the filter coefficients.

One problem associated with the DWT of finite duration signals occurs at the boundaries of the input sequence and is referred to as the edge effects problem. This problem occurs in any transformation such as a DWT that uses convolution on finite length signals. Edge effects are a consequence of the output of an FIR filter being L−1 samples longer than the input sequence. Although several edge effects solutions have been proposed, such as reflecting the end points of the input or periodically extending them, solutions tend to be application-specific. In order to clearly specify the behavior of the algorithm at the edges of the index space, the following assumption is made. The first $M/2^j$ outputs from the filters, at scale j, are valid DWT coefficients, and $L/2-1$ outputs are discarded. This assumption is by no means limiting as far as the architecture is concerned. It is always possible to derive different arrays with similar characteristics given any other solution to the edge effects problem.

The following pseudo-code represents the DWT algorithm for signal decomposition in nested loop form, with adjusted limits accounting for edge effects. The input is $X(n)=S^0(n)$, and $S^j(n)$ and $W^j(n)$ correspond to the detail and coarse sequences shown in equations (8) and (9). The index space of the algorithm is $$I = \left\{ (n, k, j) \left| \begin{array}{c} 1 \le n \le M/2^j \\ 1 \le k \le 2n \text{ for } n \le L/2 \\ 2n - L + 1 \le k \le 2n \text{ for } n > L/2 \\ 1 \le j \le J \end{array} \right. \right\} \quad (10)$$

Without loss of generality, the harmless assumptions are made that M and L are powers of 2 and that all indices start from 1. $M=2^m$ and J are the length of the original signal vector and the maximum number of levels for signal transformation, respectively.

procedure SIGNAL_DECOMP [X(n), H, G, M, J]

X(n)=input signal vector

H=low-pass wavelet filter coefficients for signal decomposition

G=high-pass wavelet filter coefficients for signal decomposition

1. $S^0(n)=X(n)$, $S^j(n)=0$, $\forall j$, $\forall n$
2. for j=1 to J
3.   for n=1 to $M/2^j$
4.     for k=max (1, 2n−L+1) to 2n
5.       $S^j(n)=S^j(n)+S^{j-1}(k) H(2n-k)$
6.       $W^j(n)=W^j(n)+S^{j-1}(k) G(2n-k)$
7.     endfor(k)
8.   endfor(n)
9. endfor(j)
10. output=$S^j(n)$, $W^j(n)$, j=1, 2, ..., J Similarly, the inverse DWT can be used for signal reconstruction. In methods consistent with the present invention, as will be detailed below, only partial reconstruction of the signal is required to determine the high-frequency ("noise") component of the signal. Therefore, the following pseudo-code represents an algorithm for reconstruction of only the high-frequency component.

procedure PARTIAL_RECONS [$W^j(n)$, j=1, 2, ..., scale, $\hat{H}$, $\hat{G}$, scale]

(This procedure computes the high-frequency ("noise") component at level scale. The reconstruction is done from level scale to level 1, where scale$\ge$1.)

$\hat{H}$=low-pass wavelet filter coefficients for signal reconstruction $\hat{G}$=high-pass wavelet filter coefficients for signal reconstruction $W^j(n)$, j=1, 2, ..., scale=output of high-pass filter. ($W^1(n)$ is the highest frequency sub-band)

$M=2^m$=length of original signal 1. for j=scale to 1
2.   for n=1 to $M/2^{(j-1)}$
      $S^{*j-1}(n)=0$ 3. for $$k = \max\left(1, \left\lceil\frac{n-L}{2}\right\rceil + 1\right) \text{ to } \left\lceil\frac{n}{2}\right\rceil$$

$S^{*j-1}(n)=S^{*j-1}(n)+W^j(k)\ \hat{G}(n-2\ (k-1))$
if (j<scale)
 $S^{*j-1}(n)=S^{*j-1}(n)+S^{*j-1}(k)\ \hat{H}(n-2\ (k-1))$
 endfor(k)
 endfor(n)
endfor(i)
4. output=$S^{*0}(n)$, n,=1, 2, . . . , M

Bandwidth Measurement

Referring again to FIG. 5, a flow control system consistent with the present invention includes bandwidth measurement module 154 and flow control module 156. As explained, it is desirable that bandwidth measurement module 154 generate an effective capacity of CBR and VBR traffic that has had high-frequency components filtered out in order to provide a stable input to flow control module 156. For the reasons described, traffic filtering mechanism based on wavelet analysis is effective for network traffic.

Figure 8:
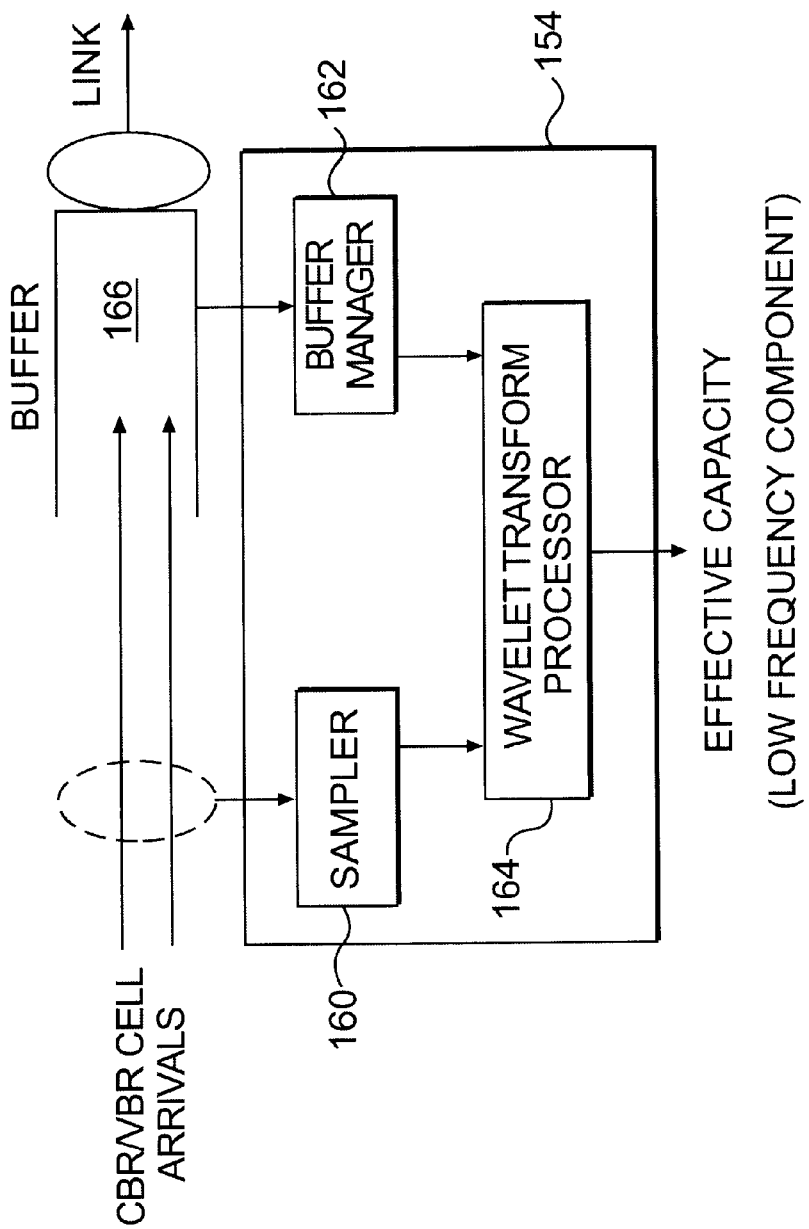
FIG. 8 illustrates components of an ABR flow control system consistent with the present invention that includes a wavelet-based traffic filtering mechanism.

FIG. 8 illustrates some components of bandwidth measurement module 154 consistent with the present invention, including a wavelet-based traffic filtering mechanism. This architecture is related to the wavelet-based connection admission control mechanism developed by P. Droz in "Traffic Estimation and Resource Allocation in ATM Networks," Diss ETH Zurich, No. 11462, 1996 (found at http:H/www.zurich.ibm.com/~dro/) ("Droz I"), and "Estimation and Resource Allocation Based on Periodical Wavelet Analysis" *4th UK/Australian International Symposium on DSP for Communication Systems*, September, 1996 ("Droz II"), which are both incorporated herein by reference.

Sampler 160 generates periodic measurements of the incoming CBR/VBR traffic arriving at buffer 166. These measurements consist of cell counts divided by Δt, where Δt is the sampling interval. The sampling frequency depends on the link speed and the buffer size. Sampler 160 feeds its output into wavelet transform-based processor 164. In periodic intervals, processor 164 analyzes the samples and calculates the effective capacity. Buffer manager 162 checks the queue length in buffer 166 and signals processor 164 if the queue length exceeds a certain threshold or if cell loss occurs. Buffer manager 162 also signals processor 162 if a certain period of time passes without cell loss. Processor 162 responds to these signals by adjusting the traffic filtering process.

Effective Capacity

Consistent with the present invention, processor 164 implements a method for calculating the measurement-based effective capacity using wavelet-based filtering. A method consistent with the present invention contains modifications and enhancements to the algorithm given in Droz I. In general, sampled traffic is separated into signal and noise, i.e., a low-frequency component and a high-frequency component. By subtracting the high-frequency component from the sampled traffic measurements, the method obtains the filtered (low-frequency) component of the original signal. The new effective capacity is the maximum of the filtered signal during the previous measured interval.

A method for calculating effective capacity consistent with the present invention uses the following parameters:

A(i), i=0, 1, 2, 3, . . . : Equidistant traffic measurements (cell counts)
n=0, 1, 2, . . . : Window number
$L_n(i)$: Low-frequencies in window n
$H_n(i)$: High-frequencies in window n
$C_n(i)$: Wavelet coefficients (window n)
$C^*_n(i)$: Modified wavelet coefficients (window n)
w=$2^m$: Window size
c=$2^k$, k>0: Calculation rate
j=0, 1, 2, . . . , m: Iteration (search) level
B: Buffer size (in cells)
ξ: Allowed buffer utilization, 0<ξ<1
A(w+nc−1): Right border of window n
A(nc): Left border of window n The original traffic measurement curve of a window is split into a low-frequency component L and a high-frequency component H according to $$\sum_{nc\le s<w+nc} A(s) = L_n(s) + H_{n,j}(s), \quad (11)$$

where $$\max_{nc\le s<w+nc}\left(\sum_{i=s}^{w+nc-1} H_{n,j}(i)\right) < \xi B, \quad (12)$$

is the break criterion between L and H. That is, to separate the high-frequency component H from the low-frequency component L, the method searches for the maximum H that fulfills equation (12). For window n at iteration level j, the left hand side of equation (12) is determined by executing the following search criterion on the vector of high-frequency components $H_{n,j}$ [i], i=1, 2, . . . , $2^m$, where max_dev is the maximum deviation of noise from zero and is determined by procedure new_cumsum [$H_{n,j}(2^m)$], illustrated by the following pseudo-code:
procedure new_cumsum [x(M)]
 (x is a vector with M elements and x(1) as the first element)
 Noise=0
 max_dev=0
 for i=1 to M
  if (Noise+x(i)<0)
   Noise=0
  else {
   Noise=Noise+x(i)
   max_dev=max(max_dev, Noise)
  }
 endfor
 output max_dev In the above procedure, the accumulant is never set below zero because in reality the available capacity in the past cannot be accumulated for use in the future. This is a modification of the cumsum(x) function provided in Droz I and Droz II, which is defined as the cumulative sum of the elements of x. That is, the ith element of cumsum(x) is $\Sigma_{j=1}^i x_j$, where $x_j$ is the jth element of x. cumsum(x) carries over negative values in its computation, while new_cumsum(x) does not.

The method searches iteratively for the strongest noise that still fulfills equation (12) using wavelet transforms. First, the wavelet transform W[ ] is executed to obtain the wavelet coefficients up to m levels of decomposition for measurement window n:

$$C_n(s)=W[A(s)]nc \leq s<w+nc \quad (13)$$

Next, the method begins an iterative process using the inverse wavelet transform $\overline{W}[\ ]$, with $j=0, 1, 2, \ldots, m$ denoting the iteration level:

$$H_{n,j}(s)=\overline{W}[C^*_{n,j}(s)],\ nc \leq s<w+nc \quad (14)$$

with $$C^*_{n,j}(s)=\{0 \text{ if } nc \leq s<nc+2^{m-j}C_n(i), \text{ otherwise} \quad (15)$$

After each back-transformation, the maximum criterion in equation (12) is checked to find the most intensive but still acceptable noise. In each iteration one more scale of coefficients is counted to the high-frequency component, whereas the rest of the coefficients are set to zero. Thus, the method searches for the largest j that still fulfills the maximum criterion. The two extreme cases are j=0 and j=m. For j=0, all traffic is counted as low-frequency, whereas, for j=m, everything is counted as high-frequency. The estimate of the effective capacity $C_e$ is then the maximum of the low-frequency component during the window:

$$\max L_n(s),\ nc \leq s<w+nc \quad (16)$$

which can be used for control purposes. If the wavelet processor uses cell counts directly, the effective capacity (in cells/second) is given by the output of the processor (in cell counts) divided by the sampling interval $\Delta t$ (in seconds).

Figure 9:
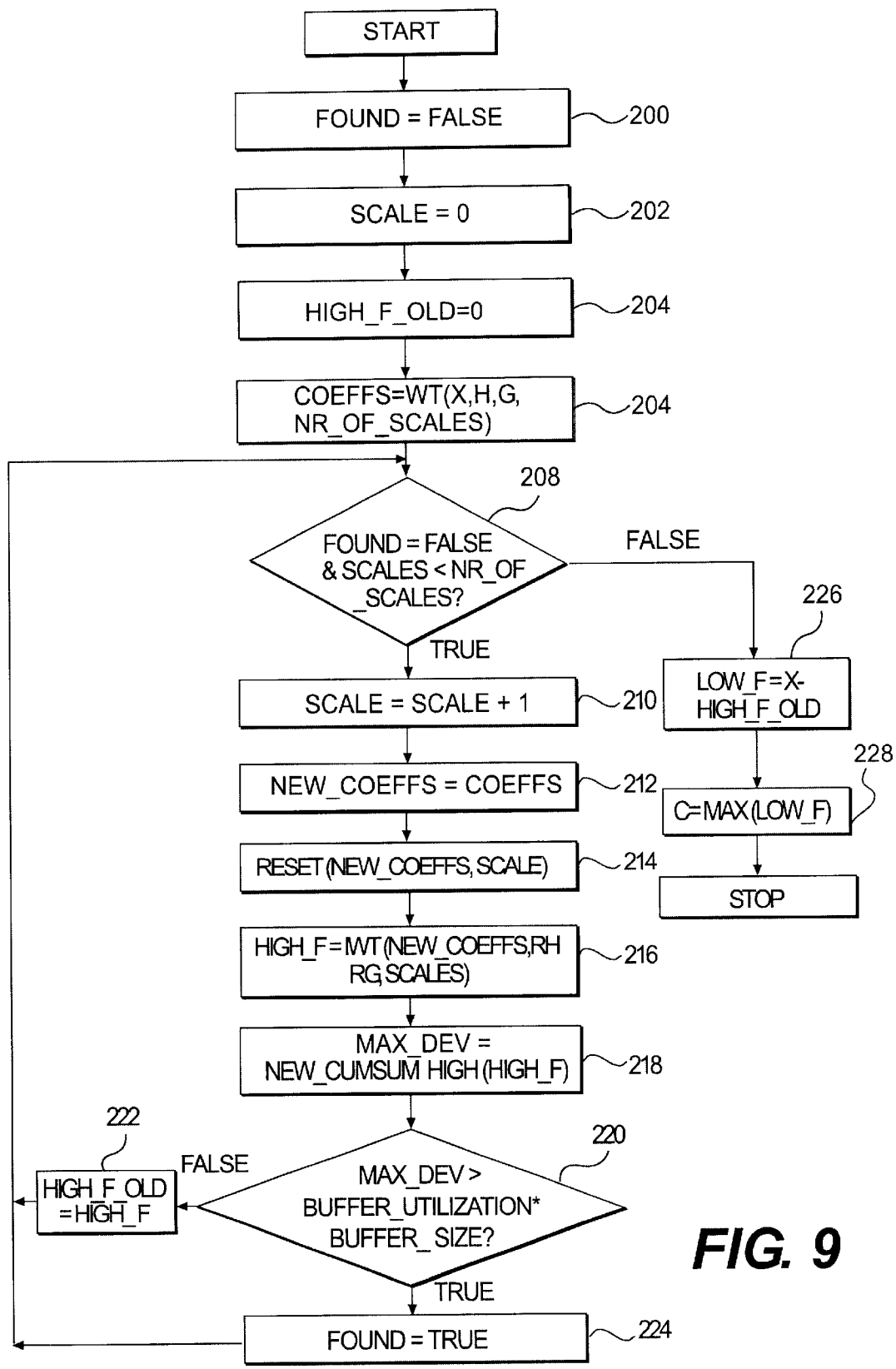
FIG. 9 is a flowchart of a method for calculating effective capacity consistent with the present invention.

FIG. 9 illustrates a flowchart of a method consistent with the present invention for calculating the effective capacity using wavelet transforms. The method uses the following parameters:

coeffs: vector of wavelet coefficients
high_f: vector of high frequencies
low_f: vector of low frequencies
X: vector of traffic measurements
h: low-pass wavelet coefficients (for signal decomposition)
g: high-pass wavelet coefficients (for signal decomposition)
scale: current level of wavelet decomposition
nr_of_scales: number of levels of wavelet decomposition
rh: low-pass wavelet filter coefficients (for signal reconstruction)
rg: high-pass wavelet filter coefficients (for signal reconstruction)
max_dev: maximum deviation of noise from zero
reset: set coarse and detail coefficients of level scale+1 and lower all to zero
found: TRUE if maximum high-frequency component satisfying equation (12) is found, FALSE otherwise After initializing found to FALSE (step 200), scale to 0 (step 202), and high_f_old to 0 (step 204), the wavelet transformation is executed to obtain the vector of wavelet coefficients coeffs. The inputs to the wavelet transformation are the traffic measurements (X), the wavelet low- and high-pass filter coefficients (h and g), and the number of levels of decomposition (nr_of_scales).

The signal/noise separation is done in the loop (steps 208–224). In step 208, if equation (12) is not satisfied (found=FALSE) and the level of decomposition is less than the total levels of decomposition, flow proceeds to step 210, which increases the level by one. Flow proceeds to step 212, which sets new_coeffs to the coefficients obtained by the wavelet transform, and then to step 214, which resets the lower level coefficients to zero. In step 216, the noise is obtained by an inverse wavelet transform using the modified coefficients. Thus, in each iteration one more level becomes part of the vector of high frequencies and all the lower levels are set to zero. Flow proceeds to step 218, in which a cumulative sum function is applied to the noise, yielding a sequence of values, the maximum of which is the maximum deviation from zero. This value represents the maximum filling of the buffer during the observed interval. In step 220, the method determines whether the maximum deviation from zero has surpassed the product of the buffer utilization and buffer size, i.e., $\xi B$. If max_dev has surpassed $\xi B$, found is set to TRUE (step 224), flow returns to step 208, and then to steps 226–228 to calculate the effective capacity. If max_dev has not surpassed $\xi B$, high_f_old is set to high_f and flow returns to step 208. In step 208, if there are more levels of decomposition, flow proceeds to steps 210–220 to continue searching for the highest noise meeting the break criterion. The break criterion is such that the maximum filling of the buffer is below the buffer size multiplied by the buffer utilization factor. If, on the other hand, the inverse wavelet transform has included every level of wavelet decomposition in its calculation, flow proceeds to steps 226–228 to determine the effective capacity.

In step 226, the low-frequency vector is computed as the difference between the vector of traffic measurements and the old high-frequency vector. For the case in which step 224 was reached because the maximum deviation had surpassed $\xi B$, the old high-frequency vector is the last one such that $\xi B$ was not surpassed. For the case in which step 224 was never reached because all levels of decomposition were analyzed without surpassing $\xi B$, the old high-frequency vector is set to the current high-frequency vector in step 222. In step 228, the effective capacity c is computed as the maximum value in the low-frequency vector.

That is, the method obtains the filtered (low-frequency) component of the original signal by subtracting the noise (high-frequency) component from the traffic measurements. The effective capacity for the next period is then taken as the maximum of the filtered signal during the previously measured interval.

The following pseudo-code represents the computation of the effective capacity $C_e$ illustrated by the flowchart of FIG. 9. The procedure calls the signal decomposition and partial signal reconstruction procedures described earlier.

```
procedure EFFECTIVE_CAP [X(n), M, H, G, Ĥ, Ĝ, J,
   buffer_size, buffer_utilization]
1. found=FALSE
   scale=0
   J=number of scales
   Input signal vector, X(n), n=1, 2, ..., M, M=2^m, J≦m,
      m is any positive integer
2. [S^j(n), W^j(n), j=1, 2, ..., j]=procedure SIGNAL_
   DECOMP [X(n), H, G, M, J]
3. while (~found && scale<j) {
   scale=scale+1
   S*^0(n)=procedure PARTIAL_RECONS [W^j(n), j=1,
      2, ..., scale, H̄, Ḡ, scale]
   max_dev=procedure new_cumsum[S*^0(n)]
   if (max_dev>buffer_size*buffer_utilization) {
      found=TRUE
      scale=scale-1
   }
} endwhile
```

4. Effective_capacity, $C_e = 0$
   ```
   if (scale==0) {
      for n=1 to M
         C_e=max (C_e, X(n))
      endfor(n)
   } else {
      S*0(n)=procedure PARTIAL_RECONS [W^j(n), j=1, 2,
         . . . , scale, H̄, Ḡ, scale]
      for n=1 to M
         C_e=max(C_e, X(n)-S*0(n))
      endfor(n)
   }
   ```
5. Convert $C_e$ to Mbps. If $X(n)$ is given in cell counts, then $C_e$ in Mbps=($C_e$ in cell counts*53*8)/sampling interval $\Delta t$ in seconds)

Figure 10:
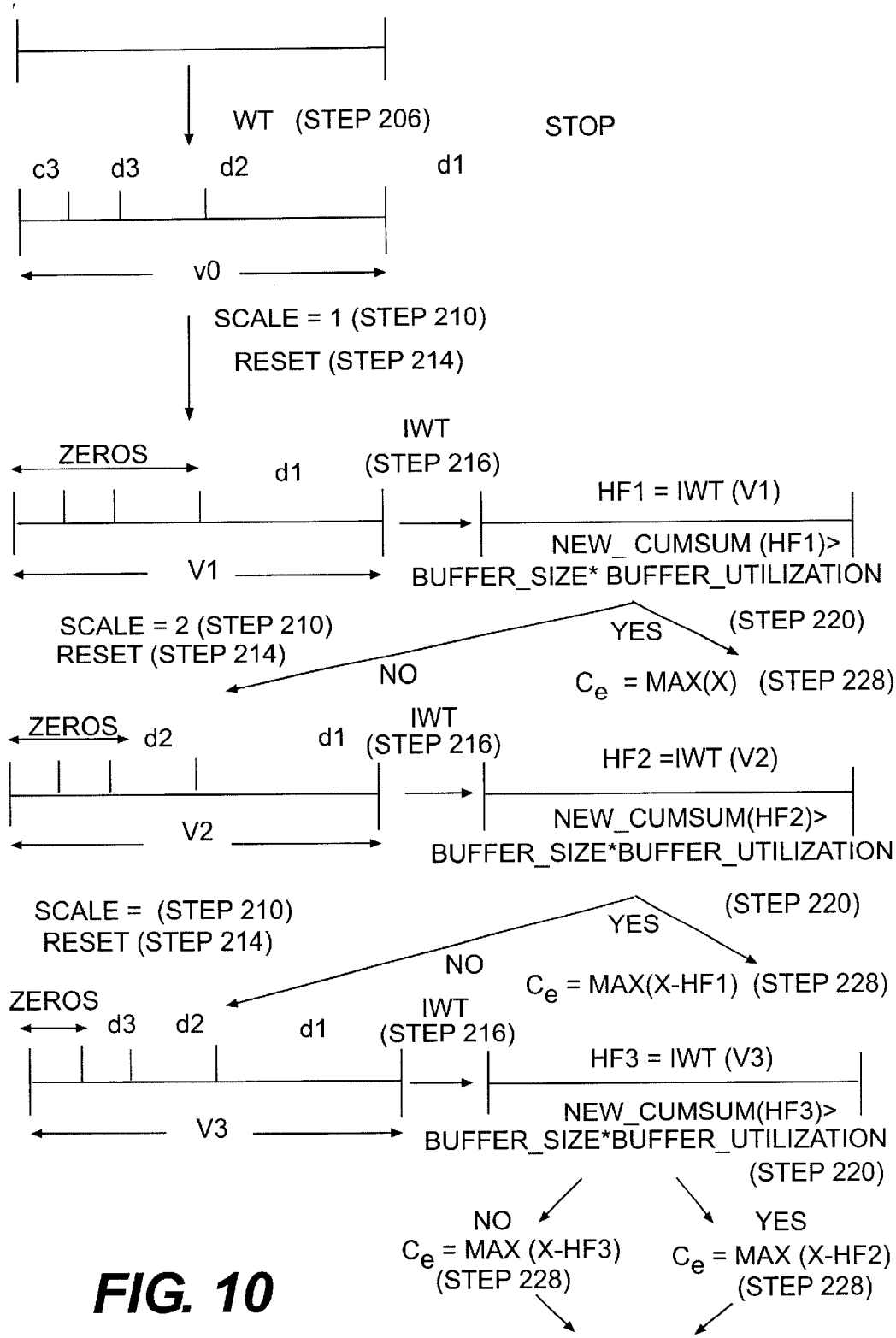
FIG. 10 illustrates an example of a method for calculating effective capacity consistent with the present invention.

FIG. 10 illustrates an example implementation of the signal/noise separation for the calculation of the effective capacity detailed in FIG. 9 using a 3-level wavelet decomposition. Steps indicated in FIG. 10 correspond to those in FIG. 9, and not all steps are shown in 110 for the sake of clarity. First, a wavelet transform is performed on the input vector X (step 206), yielding the coarse wavelet coefficient c3 and the detail coefficients d1, d2, and d3. Next, scale is set to 1 (step 210), and the reset function sets all coefficients below level 1 (i.e., all except d1) to zero (step 214). An inverse wavelet transform is performed to yield a first vector of high frequencies, hf1 (step 216). If the maximum deviation of noise from zero is greater than the product of the buffer utilization factor and the buffer size, the effective capacity is the maximum value of the input vector X (step 228). The high-frequency vector is not subtracted because the search criterion was surpassed by even the first level of decomposition. If the maximum deviation of noise from zero is not greater than the product of the buffer utilization factor and the buffer size, processing continues at the beginning of the loop. Scale is increased to 2 (step 210), and the reset function sets all coefficients below level 2 to zero (step 214). Again, an inverse wavelet transform is performed to yield a second vector of high frequencies, hf2 (step 216). If the maximum deviation of noise from zero is greater than the product of the buffer utilization factor and the buffer size, the effective capacity is the maximum value of the input vector X minus the first high-frequency vector, hf1 (step 228). If the maximum deviation of noise from zero is not greater than the product of the buffer utilization factor and the buffer size, processing continues at the beginning of the loop. Scale is increased to 3 (step 210), and the reset function sets all coefficients below level 3 (only the coarse coefficient) to zero (step 214). Again, an inverse wavelet transform is performed to yield a third vector of high frequencies, hf3 (step 216). If the maximum deviation of noise from zero is greater than the product of the buffer utilization factor and the buffer size, the effective capacity is the maximum value of the input vector X minus the second high-frequency vector, hf2 (step 228). If the maximum deviation of noise from zero is not greater than the product of the buffer utilization factor and the buffer size, the effective capacity is the maximum value of the input vector X minus the third high-frequency vector, hf3 (step 228).

An advantage in using the wavelet filtering technique described is the ability to include system parameters such as buffer utilization targets in the filtering process, which is not possible with the moving average or exponentially weighted moving average techniques. One guideline for selecting $\xi B$ is so that the target buffer utilization level does not exceed a maximum permissible delay. That is, $\xi B < d_{max}$, where $d_{max}$ is a maximum permissible delay. For example, $\xi B$ can be chosen such that $\xi B \leq 3ms$.

With different wavelet bases, it is possible to influence the speed of the noise detection and separation from the signal. Droz I suggests that the above algorithm can be improved by performing the wavelet transformation analysis incrementally in the loop. Pipelined implementation of the, transformation is also possible, as well as parallel implementations. The most efficient way, however, is to interpret the coefficients directly on the different scales. Such an interpretation is strongly influenced by the chosen wavelet basis.

Sampling of Cell Arrivals

Referring again to FIG. 8, bandwidth measurement module 154 includes sampler 160 for generating periodic measurements of the incoming CBR/VBR traffic. These measurements consist of cell counts divided by $\Delta t$, where $\Delta t$ is the sampling interval. The sampling frequency depends on the link speed and the buffer size. Sampler 160 feeds its output into wavelet transform-based processor 164. In periodic intervals, processor 164 analyzes the samples and calculates the effective capacity, as detailed above. A sampling method consistent with the present invention is based on one given in Droz I.

The highest sampling frequency is given by the maximum link speed (or output of the switch); on a 155 Mbps link, a cell can arrive every 2.735 microseconds at full load. Sampling at maximum speed can yield only two different measurement values: either a cell has been transmitted in the slot or it has not. Thus, when sampling at maximum speed it is not possible to observe any mean value, only noise. To perform a signal/noise separation where the noise is absorbed in the buffer, the sampling frequency must be high enough to capture a potential buffer filling between two sampling points. Therefore, the maximum number of cells that arrive in the time interval between the two measurement points must be below the buffer capacity. On the other hand, it is desirable to obtain more detailed information about the cell arrival process. Therefore, the sampling rate should be a fraction of the buffer size to capture a potential buffer filling between two sampling points.

The sampling interval $\Delta t$ must be chosen sufficiently large to obtain an accurate rate measurement and allow implementation; too large an interval, however, will lead to sluggish response. The measured rate is a multiple of the rate resolution $I/\Delta t$; the interval $\Delta t$ must be selected so that measurement of a solitary cell will not result in the rate being large compared to the link capacity. As a rough guideline, $\Delta t$ should be sufficiently large to produce a rate resolution of 0.5% of the target rate, $\rho_T C$, for instance. Thus, $\Delta t$ should be chosen to be approximately $1/(0.005\rho_T C)$.

For a 155 Mbps link and a 1000-cell buffer, a sample once about every millisecond is a good value; it equals a maximum of 365 cells $$\left( \frac{155 \text{ Mbps} \times 10^{-3}}{8 \text{ bits/byte} \times 53 \text{ bytes/cell}} \right),$$

which is about ⅓ of a frequently used buffer size in the range of 1000 cells. Higher sampling frequencies are possible but they increase the number of samples in the window.

Figure 11:
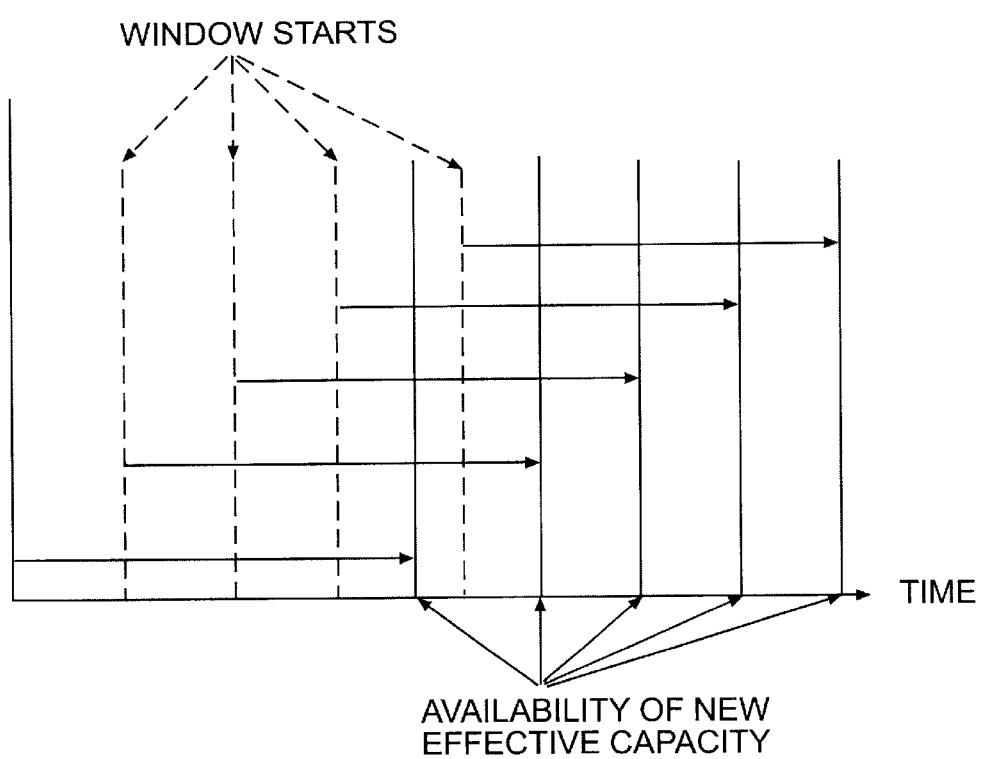
FIG. 11 illustrates a timing diagram associated with a method for calculating effective capacity consistent with the present invention.

As illustrated in FIG. 11, the effective capacity is continuously calculated using wavelet transforms applied on partially overlapping windows. The overlap is needed to capture trends across the borders of conservative windows, and the amount of overlap can depend on the extent of adaptability expected in the measuring process. Of course, the specific settings that are appropriate in any deployment environment depend on the characteristics of that environment (i.e., the traffic characteristics and link bandwidth), on how much ABR traffic a network operator wishes to admit on a link, and on the level of risk the network operator is willing to take that the service requirements will occasionally be violated.

Buffer Manager

Referring again to FIG. 8, bandwidth measurement module 154 includes buffer manager 162 for monitoring the queue in buffer 166 and signaling wavelet transform processor 164 accordingly, which responds to these signals by adjusting the traffic filtering process. For example, if the queue length in buffer 166 exceeds a threshold or if cell loss occurs, buffer manager 162 reduces the buffer utilization factor, ξ, and passes the new factor to wavelet transform processor 164. This makes flow control schemes consistent with the present invention more conservative in the sense that less filtering of high-frequency components is done. Typically, the current buffer utilization factor might be multiplied by a factor of 0.8. After a certain period of time has passed without cells being lost, buffer manager 162 increases the buffer utilization factor and passes this value to wavelet processor 164, causing more filtering of high-frequency components. A typical multiplication factor is 1.1, which increases the link utilization by 10%. In general, the reduction factor should be more drastic than the increase factor to avoid strong oscillations between cell loss and no-loss periods.

In high-speed networks such as ATM networks, a cell loss rate of $10^{-8}$ or smaller is frequently requested. Therefore, before buffer utilization can be increased, at least $10^8$ cells must have been transmitted without losses. A higher value of approximately $10^{10}$ cells can be used to decrease the chances of reverting back to a loss period. Thus, on a 155 Mbps link under full load, a period of 7.5 hours must pass before buffer utilization can be increased. For this reason it is preferable to engineer and fix the utilization on links with speeds below 2 Gbps. Only on high-speed links should buffer manager 162 signal wavelet transform processor 164 to adjust its filtering based directly on the cell loss rate because only on a high-speed link can this parameter be measured with good confidence in a reasonable time. On a 2.4 Gbps link at full load, for example, $10^{10}$ cells are transmitted in a period less than 30 minutes, so the cell loss rate can be measured fairly accurately. The higher the link speed, the faster the cell loss rate can be measured accurately.

Bandwidth Measurement Event Diagrams

Figure 12A:
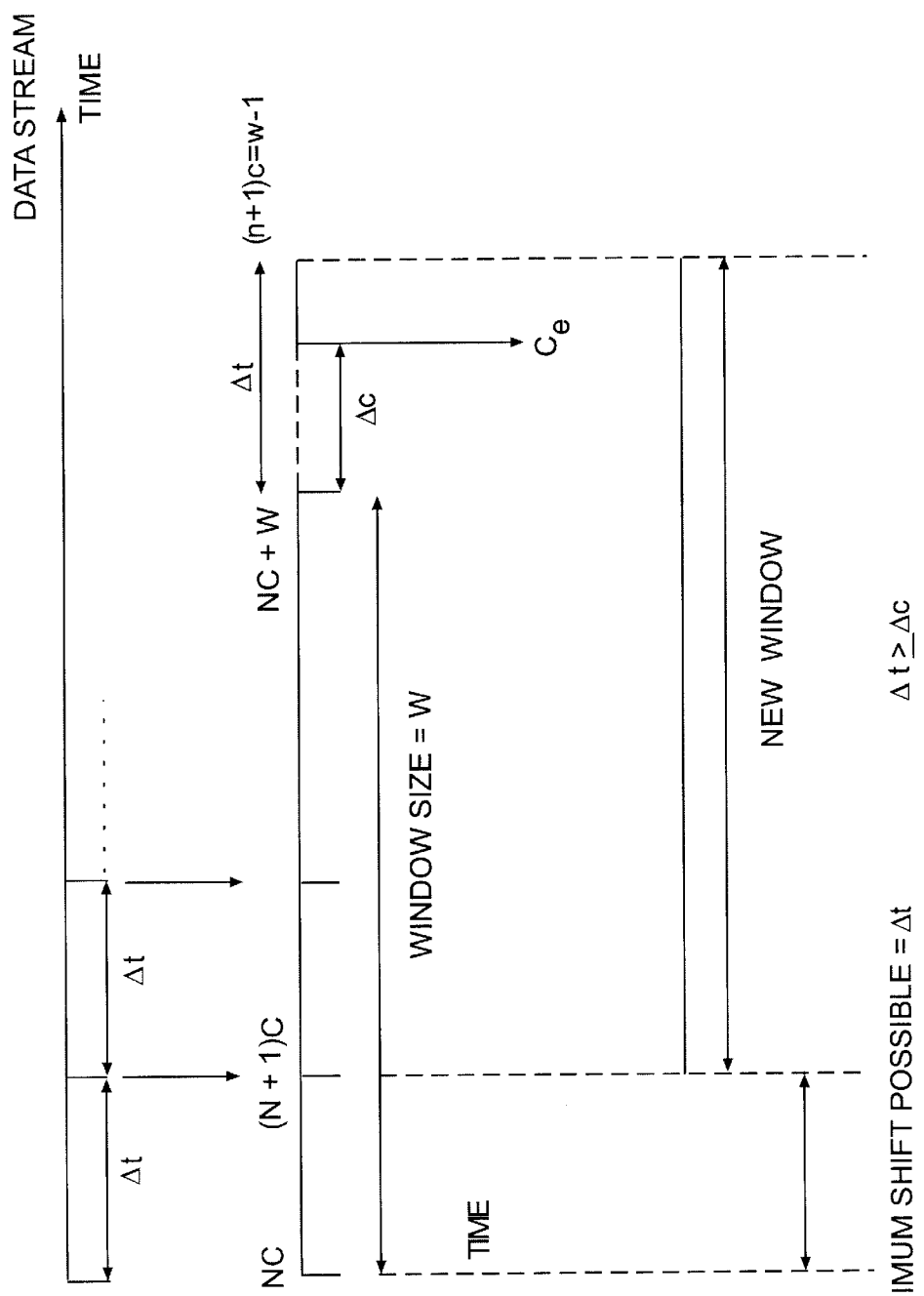
FIGS. 12A–B illustrate event diagrams associated with a method for calculating effective capacity consistent with the present invention.
Figure 12B:
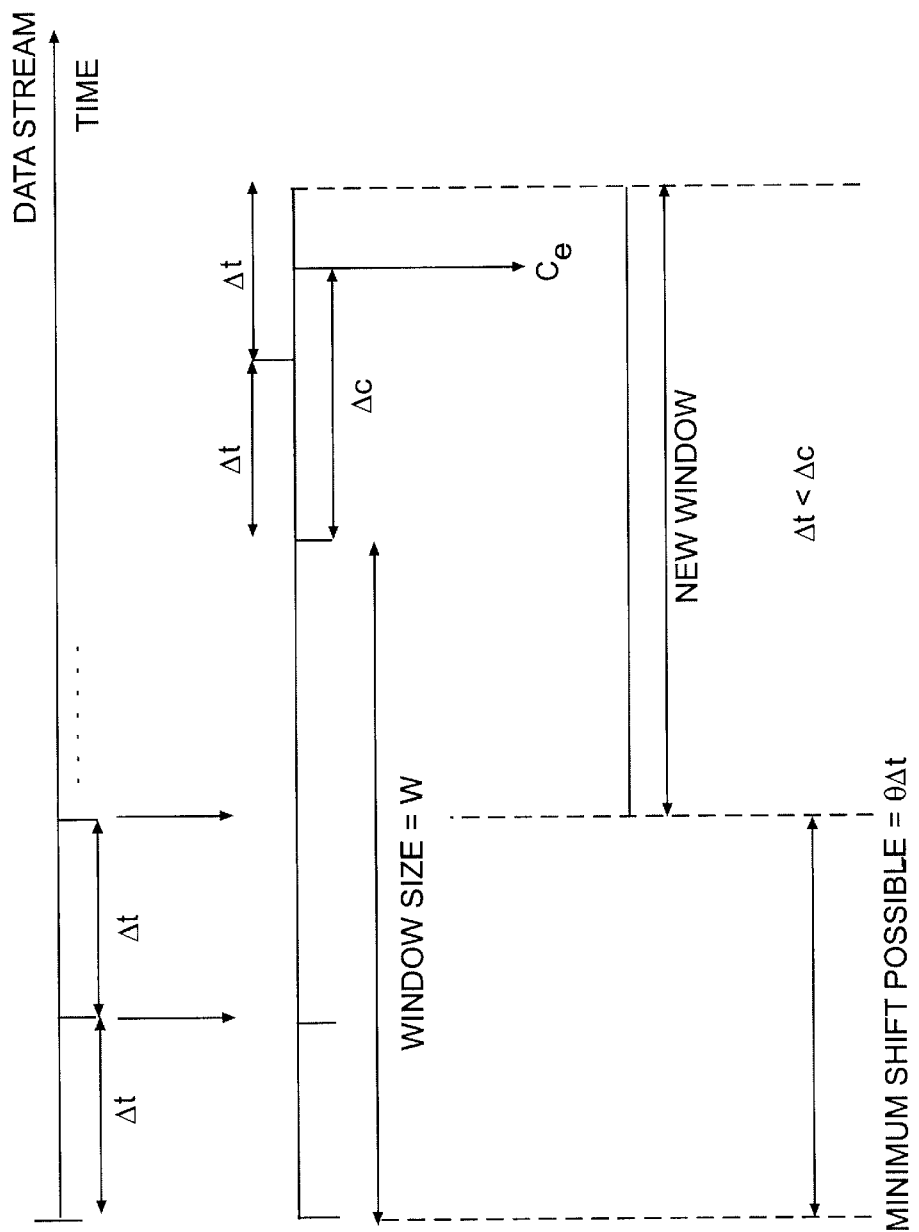

FIGS. 12A–B illustrate event diagrams for the wavelet-based traffic filtering performed by processor 164 in response to the traffic sampled by sampler 160. $\Delta t$ is the sampling interval and $\Delta c$ represents the computation time for obtaining the effective capacity $C_e$. In FIG. 12A, $\Delta t$ is greater than or equal to $\Delta c$. A first window begins at nc, and a second window begins at (n+1)c. The minimum possible difference between the start of the first and second window is $\Delta t$ because each window must start at the beginning of a sampling interval, and the effective capacity must be obtained for the first window before the end of the second window. On the other hand, in FIG. 12B, $\Delta t$ is less than $\Delta c$. Here, the second window cannot begin $\Delta t$ after the first window because the effective capacity for the first window has not yet been obtained. Rather, the minimum shift between the first and second windows is $\theta \Delta t$, where $\theta = \rceil \Delta c / \Delta t \lceil$, i.e., the next integer greater than or equal to $\Delta c / \Delta t$.

Flow Control

Figure 13:
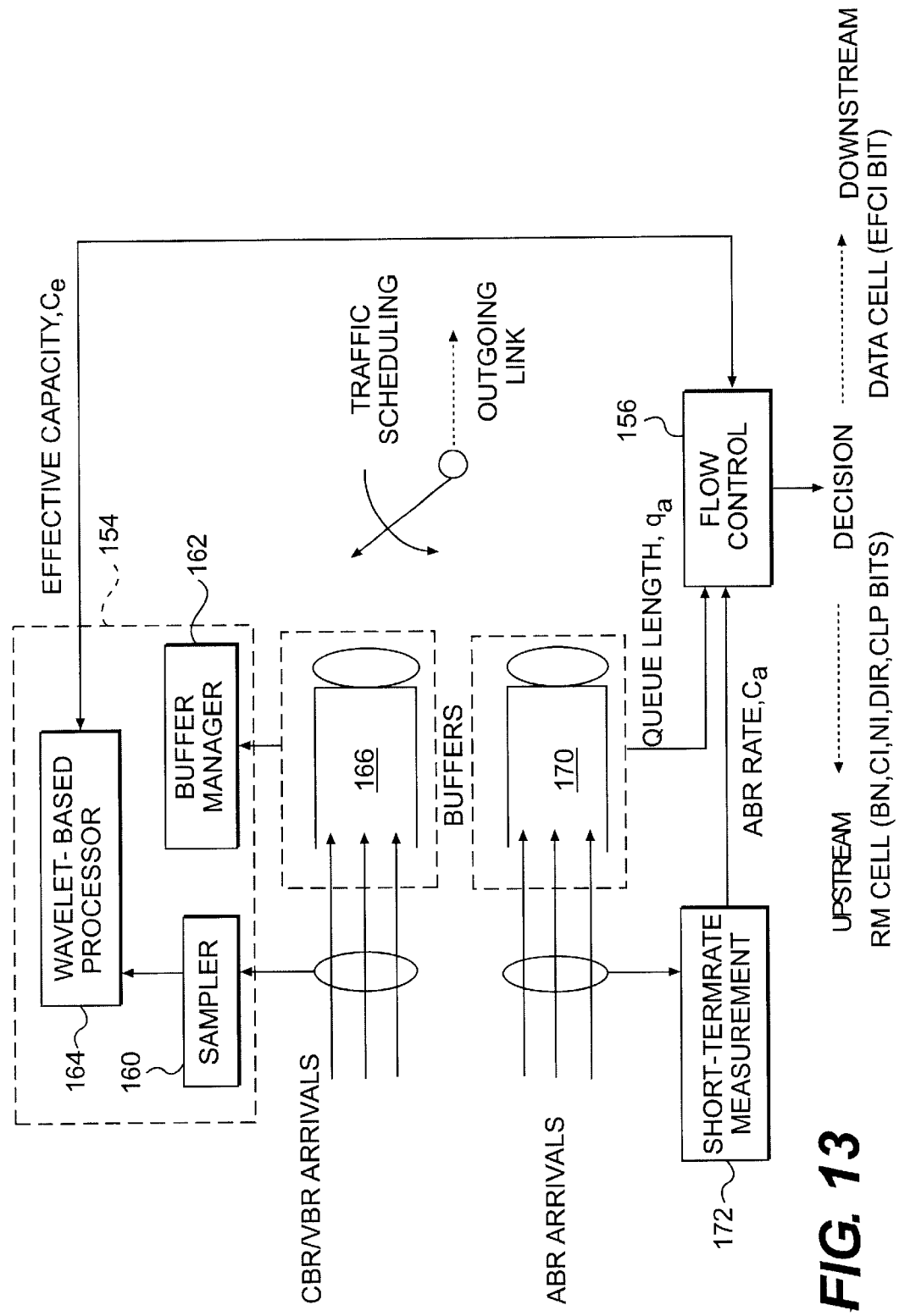
FIG. 13 illustrates an ABR flow control system consistent with the present invention.

FIG. 13 illustrates an ABR flow control system consistent with the present invention and shows the system illustrated in FIGS. 5 and 8 in more detail. Cell arrivals are divided into CBR/VBR traffic and ABR traffic, each of which enters a queue in its own set of buffers, 166 and 170, respectively. The portions of the bandwidth measurement module pertaining to CBR/VBR traffic are sampler 160, buffer manager 162, and wavelet transform processor 164, as were also shown in FIG. 8. The output of wavelet transform processor 164 is the effective capacity, $C_e$, of CBR/VBR cell arrivals, i.e., the low-pass filtered bandwidth obtained as described above. ABR arrival rates are also measured by short-term rate measurement module 172, whose output is the ABR rate, $C_a$. In a system consistent with the present invention, measurement module 172 can measure ABR arrivals using simple short-term instantaneous rate measurements. Alternatively, measurement module 172 may implement an effective capacity estimator similar to the one used to measure CBR/VBR arrivals.

Flow control module 156 uses the CBR/VBR effective capacity, $C_e$, the ABR capacity, $C_a$, and the ABR queue length to detect early congestion and outputs a decision related to flow control, e.g, the state of congestion of the switch. In a method consistent with the present invention, flow control module 156 detects congestion when the total traffic rate $C_e+C_a$ exceeds a threshold, e.g., a percentage of the available capacity on the outgoing link or virtual path, or when a queue threshold is exceeded. For example, congestion is detected when $$C_e+C_a \geq \eta C \text{ or } q \geq q_t \quad (17)$$

where η is a congestion detection thresholding factor (e.g., η=0.9) and C is the link or virtual path capacity. Upon detecting congestion, flow control module 156 indicates congestion by, erg., setting the EFCI bit to 1 in headers of data cells transmitted downstream.

The following pseudo-code illustrates the operation of an EFCI flow control mechanism consistent with the present invention for a single FIFO ABR queue:

procedure EFCI_CONTROL (EFCI Scheme with Rate Threshold Congestion Detection)
1. {Initialization}
   Initialize rate threshold factor (e.g., η=0.9);
   Initialize ABR traffic queue threshold, queue_THRESHOLD;
2. {At every cycle (window size)=w)}
   Update rate threshold factor η and queue_THRESHOLD, if necessary;
3. Receive a data cell from upstream node of virtual channel;
   if $(C_e+C_a \geq \eta C)$ or (queue_LENGTH≥queue_THRESHOLD)
      EFCI=1;
4. Send data cell to the downstream node.

It will be appreciated by those skilled in this art that various modifications and variations can be made to the flow control mechanism consistent with the present invention described herein without departing from the spirit and scope of the invention. Other embodiments of the invention will bee apparent to those skilled in this art from consideration of the specification and practice of the invention disclosed herein. It is intended that the specification and examples be considered exemplary only, with a true scope and spirit of the invention being indicated by the following claims.

We claim:

1. A system for use in controlling congestion in a network, the network including a network switch having a first buffer for receiving packets of a first type into a first queue and a second buffer for receiving packets of a second type into a second queue having a queue length, the system comprising:
   a first measurement module coupled to the first buffer for measuring an arrival rate of the packets of the first type, including
      a sampler for sampling the arrivals of the first type packets; and
      a wavelet transform processor coupled to the sampler for determining an effective arrival rate of the first type packets in response to the sampled arrivals;
   a second measurement module coupled to the second buffer for measuring an arrival rate of the packets of the second type; and
   a flow control module, coupled to the first and second measurement modules and the second buffer, for determining a congestion state of the switch based on the arrival rates of the first and second type packets and the queue length of the second queue.

2. The system of claim 1 wherein the first measurement module further comprises a buffer manager coupled to the first buffer and the wavelet transform processor, the buffer manager including
   means for monitoring the length of the first queue; and
   means for outputting a signal if the queue length exceeds a predetermined threshold;
   and wherein the wavelet transform processor determines an effective arrival rate further in response to the signal.

3. The system of claim 1 wherein the wavelet transform processor includes means for separating the sampled arrival rate into a high-frequency component and a low-frequency component.

4. The system of claim 3 wherein the separating means includes means for implementing a discrete wavelet transform.

5. The system of claim 3 wherein the separating means includes means for isolating the high-frequency component based on a second predetermined threshold.

6. The system of claim 5 wherein the second predetermined threshold is based on a measure of the buffer size.

7. The system of claim 5 wherein the isolating means includes means for implementing an inverse discrete wavelet transform.

8. The system of claim 3 wherein the wavelet transform processor further includes means for filtering the high-frequency component from the sampled arrival rate.

9. The system of claim 1 wherein the flow control module modifies a second type packet based on the switch congestion state.

10. The system of claim 1 wherein the network is an ATM network, the packets of a first type comprise CBR and VBR packets, and the packets of a second type comprise ABR packets.

11. A method for controlling congestion in a network, the network including a network switch having a first buffer for receiving packets of a first type into a first queue and a second buffer for receiving packets of a second type into a second queue having a queue length, the method comprising the steps of:
   measuring an arrival rate of the packets of the first type, including the steps of
      sampling the arrivals of the first type packets; and
      determining an effective arrival rate of the first type packets in response to the sampled arrivals using wavelet transforms;
   measuring an arrival rate of the packets of the second type; and
   determining a congestion state of the switch based on the arrival rates of the first and second type packets and the queue length of the second queue.

12. The method of claim 11 wherein the step of measuring the arrival rate of first type packets further comprises the steps of
   monitoring the length of the first queue; and
   generating a signal if the queue length exceeds a predetermined threshold;
   and wherein the step of determining the effective arrival rate of the first type packets is further in response to the signal.

13. The method of claim 11 wherein the step of determining an effective arrival rate of the first type packets includes the step of separating the sampled arrival rate into a high-frequency component and low-frequency component.

14. The method of claim 13 wherein the separating step includes the step of implementing a discrete wavelet transform.

15. The system of claim 13 wherein the separating step includes the step of isolating the high-frequency component based on a second predetermined threshold.

16. The system of claim 13 wherein the separating step includes the step of isolating the high-frequency component based on a measure of the buffer size.

17. The system of claim 15 wherein the isolating step includes the step of implementing an inverse discrete wavelet transform.

18. The system of claim 13 wherein the determining step further includes the step of filtering the high-frequency component from the sampled arrival rate.

19. The method of claim 11 further comprising the step of modifying a second type packet based on the switch congestion state.

20. The method of claim 11 wherein the network is an ATM network, the packets of a first type comprise CBR and VBR packets, and the packets of a second type comprise ABR packets.

* * * * *